US012320930B2

(12) United States Patent
Ng et al.

(10) Patent No.: US 12,320,930 B2
(45) Date of Patent: Jun. 3, 2025

(54) LOCALIZED RADIATION SENSING AND REPORTING SURFACES

(71) Applicants: DUKE UNIVERSITY, Durham, NC (US); SINGAPORE HEALTH SERVICES PTE LTD, Singapore (SG)

(72) Inventors: Chee Eng David Ng, Singapore (SG); Martin Tornai, Durham, NC (US); Terence Wong, Durham, NC (US); Timothy Turkington, Durham, NC (US)

(73) Assignees: DUKE UNIVERSITY, Durham, NC (US); SINGAPORE HEALTH SERVICES PTE LTD, Singapore (SG)

( * ) Notice: Subject to any disclaimer, the term of this patent is extended or adjusted under 35 U.S.C. 154(b) by 239 days.

(21) Appl. No.: 17/912,457

(22) PCT Filed: Mar. 19, 2021

(86) PCT No.: PCT/US2021/023306
§ 371 (c)(1),
(2) Date: Sep. 16, 2022

(87) PCT Pub. No.: WO2021/188990
PCT Pub. Date: Sep. 23, 2021

(65) Prior Publication Data
US 2023/0204801 A1 Jun. 29, 2023

Related U.S. Application Data

(60) Provisional application No. 62/991,644, filed on Mar. 19, 2020.

(51) Int. Cl.
*G01T 3/06* (2006.01)
*G01T 1/172* (2006.01)
*G01T 7/12* (2006.01)

(52) U.S. Cl.
CPC ............ *G01T 1/172* (2013.01); *G01T 3/06* (2013.01); *G01T 7/12* (2013.01)

(58) Field of Classification Search
CPC .. G01T 1/172; G01T 3/06; G01T 7/12; G01T 1/17; G01T 1/201; G01T 1/023
See application file for complete search history.

(56) References Cited

U.S. PATENT DOCUMENTS

| 3,955,088 A | 5/1976 | Muehllehner et al. |
| 4,633,881 A | 1/1987 | Moore et al. |

(Continued)

FOREIGN PATENT DOCUMENTS

| CA | 2517873 C | 4/2012 |
| CA | 2611834 C | 7/2016 |

(Continued)

OTHER PUBLICATIONS

Baumbaugh, B., et al., "Performance of multiclad scintillating and clear waveguide fibers read out with visible light photon counters," Nuclear Instruments and Methods in Physics Research Section A: Accelerators, Spectrometers, Detectors and Associated Equipment, Jun. 15, 1994, pp. 271-278, vol. 345, issue 2.

(Continued)

*Primary Examiner* — Dani Fox
*Assistant Examiner* — Mamadou Faye
(74) *Attorney, Agent, or Firm* — Talem IP Law, LLP

(57) ABSTRACT

The present disclosure describes a radiation sensing and reporting devices, systems, and methods. The devices and systems are a flexible material that detects the presence of radiation over a surface area and reports the specific location and intensity of the radiation. An article is provided that includes a substrate; a plurality of radiation sensors, each radiation sensor of the plurality of radiation sensors being disposed at a corresponding position on the substrate; and (Continued)

alert circuitry coupled to the plurality of radiation sensors, wherein the alert circuitry indicates, in real time, a localized detection of radiation according to corresponding one or more positions on the substrate of a particular one or more radiation sensors of the plurality of radiation sensors.

13 Claims, 14 Drawing Sheets

(56) References Cited

U.S. PATENT DOCUMENTS

| | | | |
|---|---|---|---|
| 4,788,436 | A | 11/1988 | Koechner |
| 8,115,182 | B1 | 2/2012 | Patel |
| 9,702,984 | B1 | 7/2017 | Dowell et al. |
| 9,851,458 | B2 | 12/2017 | Workman |
| 2002/0070365 | A1* | 6/2002 | Karellas ............... A61B 6/512 250/581 |
| 2006/0054830 | A1 | 3/2006 | Oyaizu et al. |
| 2006/0153341 | A1* | 7/2006 | Guyonnet ............... G01T 1/201 378/207 |
| 2009/0050812 | A1* | 2/2009 | Dunleavy ............ G01T 1/2002 250/368 |
| 2015/0309185 | A1* | 10/2015 | Chichester ............... G01T 7/00 250/362 |
| 2016/0266260 | A1* | 9/2016 | Preston .................... G01T 1/208 |
| 2016/0322418 | A1 | 11/2016 | Leblans et al. |
| 2017/0038486 | A1* | 2/2017 | Workman ................. G01T 1/20 |
| 2020/0025946 | A1* | 1/2020 | Munier ................... G01T 1/023 |
| 2021/0069980 | A1* | 3/2021 | Baker .................... B33Y 80/00 |

FOREIGN PATENT DOCUMENTS

| | | |
|---|---|---|
| CN | 104407372 A | 3/2015 |
| EP | 2751592 B1 | 8/2015 |
| JP | H07306270 A | 11/1995 |
| WO | 2020051257 A1 | 3/2020 |

OTHER PUBLICATIONS

Chung, M., et al., "Effects of stress and strain on scintillating and clear fibers," IEEE Transactions on Nuclear Science, Aug. 1995 (accessible Nov. 1, 1994), pp. 323-327, vol. 42, issue 4.

Blaich, T., et al., "A large area detector for high-energy neutrons," Nuclear Instruments and Methods in Physics Research Section A: Accelerators, Spectrometers, Detectors and Associated Equipment, Apr. 1, 1992, pp. 136-154, vol. 314, issue 1.

Altmeier, M., et al., "A helical scintillating fiber hodoscope," Nuclear Instruments and Methods in Physics Research Section A: Accelerators, Spectrometers, Detectors and Associated Equipment, Jul. 21, 1999, pp. 428-436, vol. 431, issue 3.

Lawrence, D. J., et al., "Large-area scintillating-fiber time-of-flight/ hodoscope detectors for particle astrophysics experiments," Nuclear Instruments and Methods in Physics Research Section A: Accelerators, Spectrometers, Detectors and Associated Equipment, Jan. 11, 1999, pp. 402-415, vol. 420, issue 3.

Hou, Jie, et al., "Optimisation and performance test of fibre-based large-area surface contamination monitor," Results in Physics, Dec. 2019 (accessible Oct. 4, 2019), 8 pages, vol. 15, article 102727.

Swinth, K. L., "Photon Counting with Fiber-Optic Coupled Scintillators," IEEE Transactions on Nuclear Science, Feb. 1974, pp. 119-124, vol. 21, issue 1.

Swinth, K. L., et al., "Biomedical probe using a fiber-optic coupled scintillator," Medical Physics, Mar. 1976, pp. 109-112, vol. 3, issue 2.

Barber, H. B., et al., "Small Radiation Detectors for Bronchoscopic Tumor Localization," IEEE Transactions on Nuclear Science, Feb. 1980, pp. 496-502, vol. 27, issue 1.

Harvey, William C., et al., "Technical and clinical characteristics of a surgical biopsy probe," Journal of Nuclear Medicine, Feb. 1981, pp. 184-186, vol. 22, issue 2, Soc Nuclear Med.

Brenci, M., et al., "Optical Fibers With Enlarged Ends for Surgical Use," Mar. 26, 1984, pp. 28-33, vol. 45, Paris, France.

Colton, C.L., et al., "Evaluation of a sterilizable radiation probe as an aid to the surgical treatment of osteoid-osteoma. Technical note," Journal of Bone and Joint Surgery, Sep. 1983, pp. 1019-1022, vol. 65, issue 7, LWW.

Anderson, Jon A., et al., "Constructing a small laboratory animal imaging device based on scintillating fibers", Scintillating Fiber Technology and Applications, Oct. 22, 1993, pp. 125-131, vol. 2007, SPIE, San Diego, CA.

Daghighian, Farhad, et al., "Intraoperative beta probe: a device for detecting tissue labeled with positron or electron emitting isotopes during surgery," Medical Physics, Jan. 1994, pp. 153-157, vol. 21, issue 1, Wiley Online Library.

Raylman, R. R., et al., "A fiber-optically coupled positron-sensitive surgical probe," Journal of Nuclear Medicine: Official Publication, Society of Nuclear Medicine, May 1, 1994, pp. 909-913, vol. 35, issue 5.

MacDonald, L.R., et al., "Investigation of the physical aspects of beta imaging probes using scintillating fibers and visible light photon counters," IEEE Transactions on Nuclear Science, Aug. 1995, pp. 1351-1357, vol. 42, issue 4.

MacDonald, Lawrence R., et al., "Small-area fiber-coupled scintillation camera for imaging beta-ray distributions intraoperatively", Proceedings of SPIE—The International Society for Optical Engineering, Sep. 8, 1995, p. 92-101, vol. 2551, San Diego, CA, United States.

Raylman, R. R., et al., "Fluorine-18-fluorodeoxyglucose-guided breast cancer surgery with a positron-sensitive probe: validation in preclinical studies," Journal of Nuclear Medicine: Official Publication, Society of Nuclear Medicine, Oct. 1995, pp. 1869-1874, vol. 36, issue 10.

Tornai, M. P., et al., "Design considerations and initial performance of a 1.2 cm/sup 2/ beta imaging intra-operative probe," IEEE Transactions on Nuclear Science, Sep. 1996 (Accessible Aug. 1996), pp. 1791-1795, vol. 43, issue 4.

Hoffman, Edward J., et al., "Gamma and beta intra-operative imaging probes," Nuclear Instruments and Methods in Physics Research Section A: Accelerators, Spectrometers, Detectors and Associated Equipment, Jun. 21, 1997, pp. 324-329, vol. 392, issue 1-3.

Tornai, M. P., et al., "Investigation of crystal geometries for fiber coupled gamma imaging intra-operative probes," IEEE Transactions on Nuclear Science, Jun. 1997, pp. 1254-1261, vol. 44, issue 3.

Archambault, Louis, et al., "Plastic scintillation dosimetry: Optimal selection of scintillating fibers and scintillators: Optimal selection of scintillating fiber," Medical Physics, Jun. 20, 2005, pp. 2271-2278, vol. 32, issue 7Part1.

Rego, Florbela, et al., "Si-PIN photodiode readout for a scintillating optical fiber dosimeter," Radiation Measurements, Oct. 2012, pp. 947-950, vol. 47, issue 10.

Moutinho, L. M., et al., "Development of a scintillating optical fiber dosimeter with silicon photomultipliers," Nuclear Instruments and Methods in Physics Research Section A: Accelerators, Spectrometers, Detectors and Associated Equipment, Jan. 2014 (accessible Oct. 22, 2013), pp. 640-643, vol. 735.

PETsys Electronics, "PETsys TOF ASIC Evaluation Kit", Nov. 2020, PETsys Electronics Medical PET Detectors, S.A., 2 pages.

D'asseler, Y., et al., "PET imaging using gamma cameras," Computerized Medical Imaging and Graphics, Mar. 2001, pp. 87-96, vol. 25, issue 2.

International Search Report and Written Opinion issued in International Application No. PCT/US2021/023306, mailed Jun. 8, 2021, 9 pages.

Extended Search Report issued in EPO Application No. 21770904. 7, mailed Mar. 21, 2024, 38 pages.

Vano, E., et al., "Radiation exposure to medical staff in interventional and cardiac radiology," The British Journal of Radiology, Sep. 1998, pp. 954-960, vol. 71, issue 849.

Zweers, D., et al., "Patient and staff radiation dose in fluoroscopy-guided TIPS procedures and dose reduction, using dedicated fluo-

(56) References Cited

OTHER PUBLICATIONS roscopy exposure settings," The British Journal of Radiology, Jun. 1998, pp. 672-676, vol. 71, issue 846.
Balter, Stephen, "Radiation safety in the cardiac catheterization laboratory: Basic principles," Catheterization and Cardiovascular Interventions, Jun. 14, 1999, pp. 229-236, vol. 47, issue 2.
Buls, N., et al., "Patient and staff exposure during endoscopic retrograde cholangiopancreatography," The British Journal of Radiology, May 31, 2002, pp. 435-443, vol. 75, issue 893.
Kuon, Eberhard, et al., "Significant reduction of radiation exposure to operator and staff during cardiac interventions by analysis of radiation leakage and improved lead shielding," The American Journal of Cardiology, Jan. 2002 (accessible Dec. 30, 2001), pp. 44-49, vol. 89, issue 1.
Rihss Working Party and European Commission, "Proceedings of Scientific Seminar on Medical Overexposures held in Luxembourg on Oct. 16, 2003," Dec. 2008, European Union, Luxembourg, 47 pages.
Schueler, Beth A., et al., "An Investigation of Operator Exposure in Interventional Radiology," RadioGraphics, Sep. 1, 2006, pp. 1533-1541, vol. 26, issue 5.
Vanhavere, F., et al., "An overview on extremity dosimetry in medical applications," Radiation Protection Dosimetry, Feb. 18, 2008, pp. 350-355, vol. 129, issue 1-3.
Jaco, John W., et al., "Measuring and Monitoring Radiation Dose During Fluoroscopically Guided Procedures," Techniques in Vascular and Interventional Radiology, Sep. 2010, pp. 188-193, vol. 13, issue 3.
Miller, Donald L., et al., "Occupational Radiation Protection in Interventional Radiology: A Joint Guideline of the Cardiovascular and Interventional Radiology Society of Europe and the Society of Interventional Radiology," CardioVascular and Interventional Radiology, Apr. 2010 (accessible Dec. 18, 2009), pp. 230-239, vol. 33, issue 2.
Vañó, Eliseo, "Mandatory Radiation Safety Training for Interventionalists: The European Perspective," Techniques in Vascular and Interventional Radiology, Sep. 2010, pp. 200-203, vol. 13, issue 3.
Paolucci, M., et al., "A real time active pixel dosimeter for interventional radiology," Radiation Measurements, Nov. 2011, pp. 1271-1276, vol. 46, issue 11.
Simeonov, Georgi, et al., "Radiation protection of medical staff in the latest draft of the revised Euratom Basic Safety Standards directive," Radiation Measurements, Nov. 2011, pp. 1197-1199, vol. 46, issue 11.
Vañó, E., "ICRP and radiation protection of medical staff," Radiation Measurements, Nov. 2011, pp. 1200-1202, vol. 46, issue 11.
Kesavachandran, Chandrasekharan Nair, et al., "Radiation exposure of eyes, thyroid gland and hands in orthopaedic staff: a systematic review," European Journal of Medical Research, Dec. 2012, p. 1-10, vol. 17, issue 1, article 28.
Yoo, Wook Jae, et al., "Development of a scintillating fiber-optic dosimeter for measuring the entrance surface dose in diagnostic radiology," Radiation Measurements, Jan. 2013 (Accessible: Nov. 16, 2012), pp. 29-34, vol. 48.
Desimone, Ariadne K., et al., "Radiology Trainee vs Faculty Radiologist Fluoroscopy Time for Imaging-Guided Procedures: A Retrospective Study of 17,966 Reports Over a 5.5-Year Period," Current Problems in Diagnostic Radiology, Jul. 2018, pp. 233-237, vol. 47, issue 4.
Sackett, Greg, "Radiation Safety Issues for Radiologic Technologists," Nov. 2012, Integrated Science Support, Inc, 27 pages.
Dubowitz, David, "Fluoroscopy," Feb. 2, 2015, UC SanDiego, 9 pages.
Jansen, S. E., et al., "Staff radiation doses during eight years in a nuclear medicine radiopharmacy:," Nuclear Medicine Communications, Feb. 1994, pp. 114-118, vol. 15, issue 2.
Greaves, C. D., et al., "Dose rate measurements from radiopharmaceuticals: implications for nuclear medicine staff and for children with radioactive parents," Nuclear Medicine Communications, Feb. 1999, pp. 179-187, vol. 20, issue 2.
Gomez-Palacios, M., et al., "Radiation Doses in the Surroundings of Patients Undergoing Nuclear Medicine Diagnostic Studies," Health Physics, Aug. 2005, pp. S27-34, vol. 89, issue 2.
Klausen, T. L., et al., "Radiation doses to staff involved in sentinel node operations for breast cancer," Clinical Physiology and Functional Imaging, Jul. 2005 (accessible Jun. 21, 2005), pp. 196-202, vol. 25, issue 4.
Roberts, Fiona O., et al., "Radiation dose to PET technologists and strategies to lower occupational exposure," Journal of Nuclear Medicine Technology, Mar. 2005, pp. 44-47, vol. 33, issue 1.
Pant, Gauri S., et al., "Finger doses for staff handling radiopharmaceuticals in nuclear medicine," Journal of Nuclear Medicine Technology, Sep. 2006, pp. 169-173, vol. 34, issue 3.
Lucena, E. A., et al., "Evaluation of internal exposure of nuclear medicine staff through in vivo and in vitro bioassay techniques," Radiation Protection Dosimetry, Nov. 2007 (accessible Aug. 6, 2007), pp. 465-468, vol. 127, issue 1-4.
Rimpler, A., et al., "Beta radiation exposure of medical staff and implications for extremity dose monitoring," Radiation Protection Dosimetry, Jan. 12, 2007, pp. 335-339, vol. 125, issue 1-4.
Andersen, P. A., et al., "Radiation exposure to surgical staff during F-18-FDG-guided cancer surgery," European Journal of Nuclear Medicine and Molecular Imaging, Mar. 2008 (accessible Oct. 23, 2007), pp. 624-629, vol. 35, issue 3.
Fog, L. S., et al., "Monte Carlo simulation of the dose to nuclear medicine staff wearing protective garments," Australasian Physics & Engineering Sciences in Medicine, Dec. 2008, pp. 307-316, vol. 31, issue 4.
Mettler, Fred A., et al., "Effective Doses in Radiology and Diagnostic Nuclear Medicine: A Catalog," Radiology, Jul. 1, 2008, pp. 254-263, vol. 248, issue 1.
Mettler, Fred A., et al., "Radiologic and Nuclear Medicine Studies in the United States and Worldwide: Frequency, Radiation Dose, and Comparison with Other Radiation Sources-1950-2007," Radiology, Nov. 1, 2009, pp. 520-531, vol. 253, issue 2.
Covens, P., et al., "The introduction of automated dispensing and injection during PET procedures: a step in the optimisation of extremity doses and whole-body doses of nuclear medicine staff," Radiation Protection Dosimetry, Aug. 1, 2010 (accessible Mar. 23, 2010), pp. 250-258, vol. 140, issue 3.
Covens, Peter, et al., "The contribution of skin contamination dose to the total extremity dose of nuclear medicine staff: first results of an intensive survey," Radiation Measurements, Nov. 2011, pp. 1291-1294, vol. 46, issue 11, Elsevier.
Kopec, R., et al., "On the relationship between whole body, extremity and eye lens doses for medical staff in the preparation and application of radiopharmaceuticals in nuclear medicine," Radiation Measurements, Nov. 2011, pp. 1295-1298, vol. 46, issue 11.
Leide-Svegborn, S., "External radiation exposure of personnel in nuclear medicine from 18F, 99mTC and 131I with special reference to fingers, eyes and thyroid," Radiation Protection Dosimetry, Apr. 1, 2012 (accessible May 12, 2011), pp. 196-206, vol. 149, issue 2.
Lochard, J., et al., "Application of the Commissions's recommendations to the protection of people living in long-term contaminated areas after a nuclear accident or a radiation emergency," International Commission on Radiological Protection, 2009, vol. 39, issue 3, 74 pages.
Mattsson, Soren, "Introduction: The Importance of Radiation Protection in Nuclear Medicine," Radiation Protection in Nuclear Medicine, 2013 (accessible Jan. 1, 2012), pp. 1-3, Springer, Berlin, Heidelberg.
Dauer, Lawrence T., "Exposed medical staff: challenges, available tools, and opportunities for improvement," Health Physics, Feb. 2014, pp. 217-224, vol. 106, issue 2.
Villoing, Daphnee, et al., "A U.S. Multicenter Study of Recorded Occupational Radiation Badge Doses in Nuclear Medicine," Radiology, May 2018 (accessible Feb. 1, 2018), pp. 676-682, vol. 287, issue 2.
Koenig, Titus R., et al., "Skin Injuries from Fluoroscopically Guided Procedures: Part 1, Characteristics of Radiation Injury," American Journal of Roentgenology, Jul. 2001, pp. 3-11, vol. 177, issue 1.

(56) References Cited

OTHER PUBLICATIONS

Balter, Stephen, et al., "Fluoroscopically Guided Interventional Procedures: A Review of Radiation Effects on Patients" Skin and Hair, Radiology, Feb. 2010 (accessible Jan. 7, 2010), pp. 326-341, vol. 254, issue 2.

Monaco, Joan L., et al., "Iatrogenic deep musculocutaneous radiation injury following percutaneous coronary intervention," The Journal of Invasive Cardiology, Aug. 1, 2003, pp. 451-453, vol. 15, issue 8.

Koenig, Titus R., et al., "Skin Injuries from Fluoroscopically Guided Procedures: Part 2, Review of 73 Cases and Recommendations for Minimizing Dose Delivered to Patient," American Journal of Roentgenology, Jul. 2001, pp. 13-20, vol. 177, issue 1.

Stecker, Michael S., et al., "Guidelines for patient radiation dose management," Journal of Vascular and Interventional Radiology: JVIR, Jul. 2009, pp. S263-273, vol. 20, issue 7 Suppl.

Padovani, R., et al., "Patient dosimetry approaches in interventional cardiology and literature dose data review," Radiation Protection Dosimetry, Dec. 1, 2005, pp. 217-221, vol. 117, issue 1-3.

White, T. O., "Scintillating fibres," Nuclear Instruments and Methods in Physics Research Section A: Accelerators, Spectrometers, Detectors and Associated Equipment, Dec. 15, 1988, pp. 820-825, vol. 273, issue 2-3.

Hartjes, F. G., et al., "Scintillating plastic fibres for hadron calorimetry," Nuclear Instruments and Methods in Physics Research Section A: Accelerators, Spectrometers, Detectors and Associated Equipment, May 1, 1989, pp. 379-385, vol. 277, issue 2-3.

Bross, Alan D., "Scintillating plastic optical fiber radiation detectors in high-energy particle physics," Plastic Optical Fibers, Dec. 1, 1991, pp. 122-132, vol. 1592, SPIE, Boston, MA.

\* cited by examiner

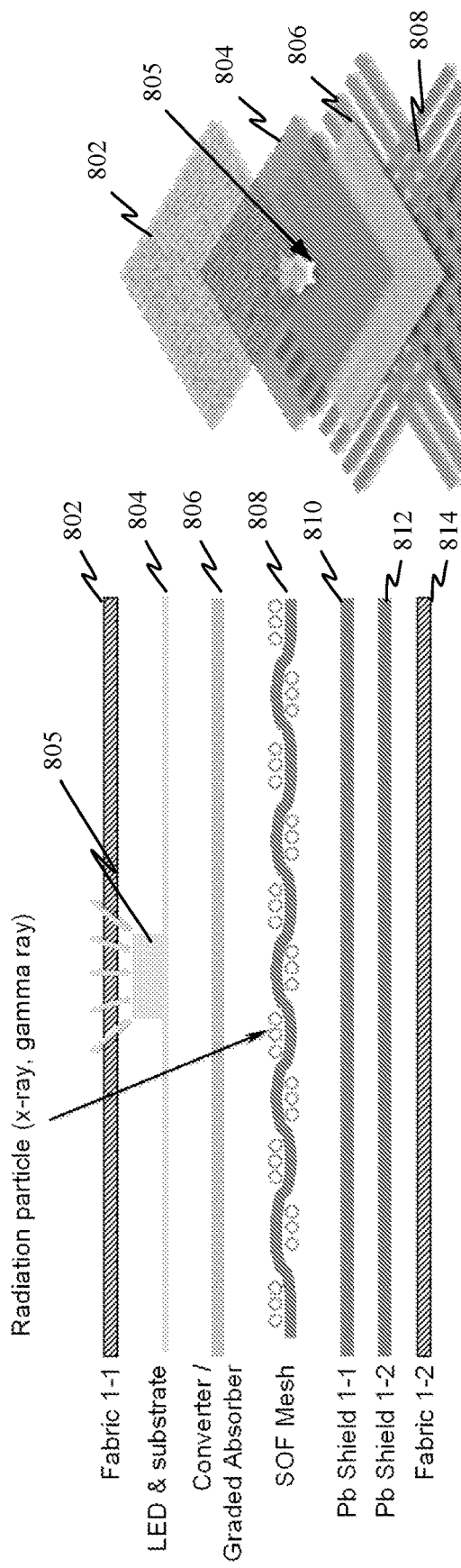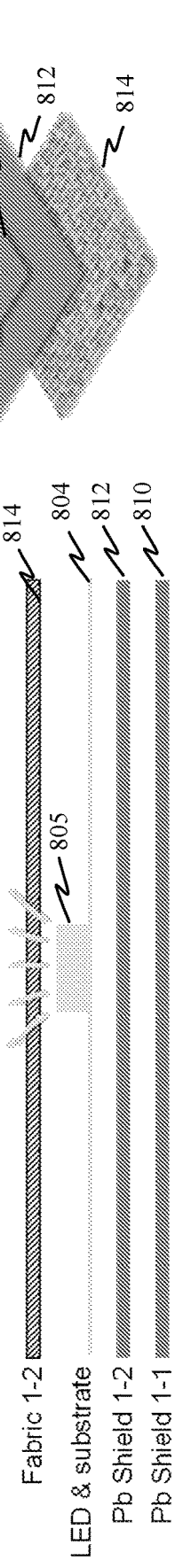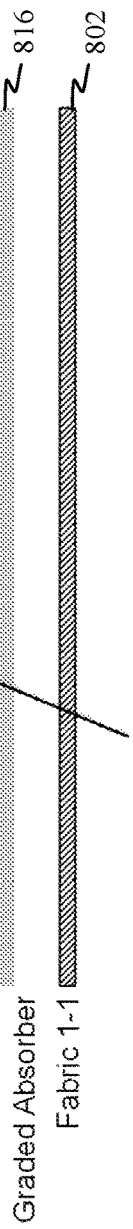
FIG. 8A
FIG. 8B
FIG. 8C

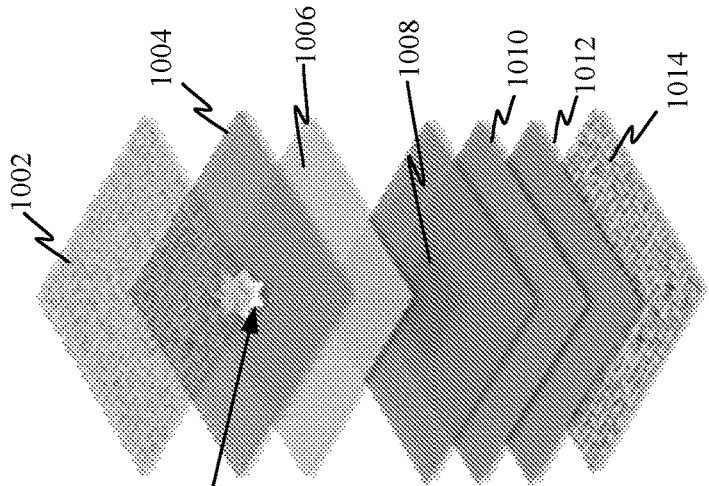
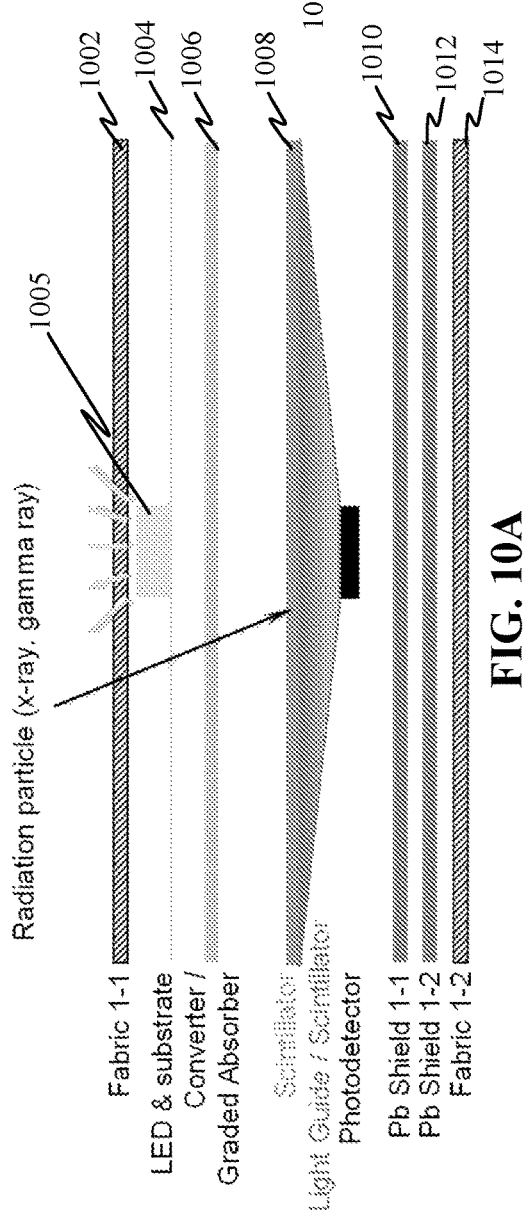
FIG. 10A
FIG. 10B
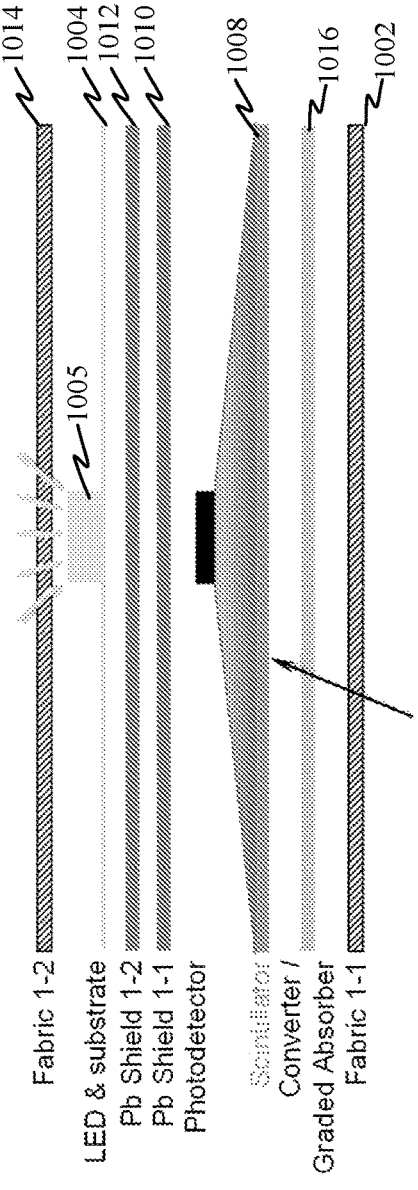
FIG. 10C

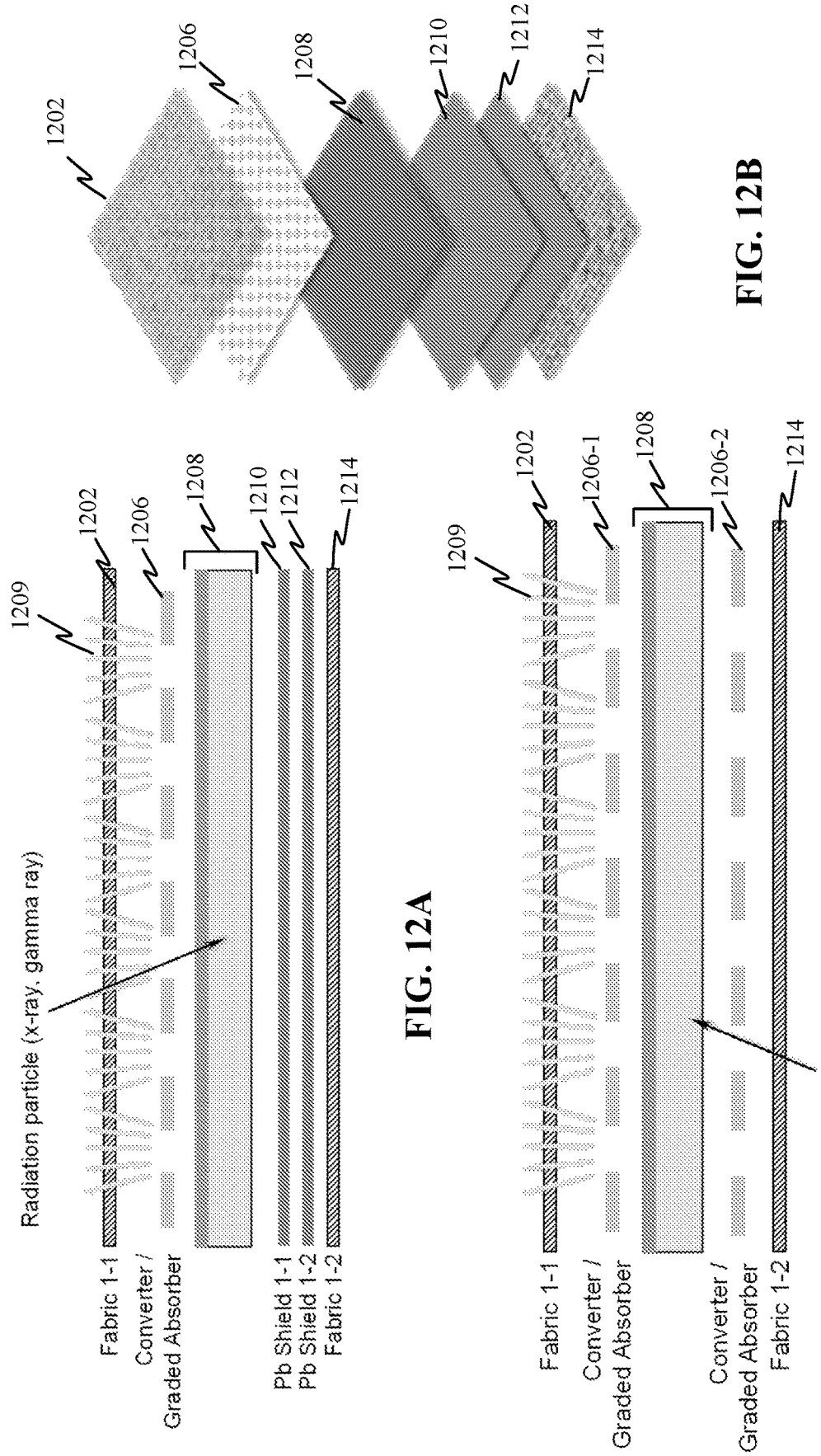

LOCALIZED RADIATION SENSING AND REPORTING SURFACES

CROSS-REFERENCE TO RELATED APPLICATIONS

The present invention is the U.S. National Stage Application of International Application No. PCT/US21/23306, filed Mar. 19, 2021, which claims the benefit of U.S. Provisional Application Ser. No. 62/991,644, filed Mar. 19, 2020.

BACKGROUND

Human health risk associated with radiation exposure is a well-studied field. The US Nuclear Regulatory Commission (NRC) has established dose limits for various body regions and recommends several radiation sensor types. However, currently available sensors are limited in functionality. There is no protective covering that detects and instantaneously reports the quantitative exposure to radioactivity for a specific location over a large surface area. Personal dosimeters exist, but these are typically passive detectors that are measured retrospectively. Other types of electronic devices may give immediate audible feedback, but only at one location. Those working in high radiation environments, including fluoroscopy staff and nuclear power workers, must therefore be vigilant about direct and scattered radiation because it is difficult to know precisely where they are being exposed. Thus, there is an ongoing need for a detector that comprehensively detects and/or reports the location of radiation exposure to a large surface area in real time.

BRIEF SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

There is currently no detector or protective covering that detects, quantifies, and instantaneously reports exposure to radioactivity over a large surface area, such as on the area of the protective gear used by clinical fluoroscopy staff or other radiation workers. The present disclosure addresses at least some of these and other challenges through devices and systems for detecting general-area radiation exposure. For example, through the described devices and systems it is possible to make radiation "visible" so that occupational workers can react in real-time, thereby minimizing their exposures.

An article is provided that includes a substrate, a plurality of radiation sensors, each radiation sensor of the plurality of radiation sensors being disposed at a corresponding position on the substrate; and alert circuitry coupled to the plurality of radiation sensors, wherein the alert circuitry indicates, in real time, a localized detection of radiation according to corresponding one or more positions on the substrate of a particular one or more radiation sensors of the plurality of radiation sensors.

One aspect of the present disclosure provides such an article, which can be referred to as a Smart Radiation Sensing and Reporting Surface (SRSRS). The SRSRS is a lightweight, self-contained, flexible covering that can be used in various radiation-based settings where ionizing radiation is used. The SRSRS can be integrated into radiation protective garments, such as those used in fluoroscopy suites, or the SRSRS can be formed as a sheet-like material and placed over equipment or on the ground where radiation spills or inadvertent radiopharmaceutical contamination has occurred. In real time, the article detects the locus of intense radiation on various locations, such as on the wearer's body or in a spill on the floor, and reports the location with, for example, light-emitting-diode (LED) signals that are easily visible by those in the vicinity of the article.

Potential applications include real-time, precise location monitoring of clinic workers, detection of existing radiation spills, and worker training, among others. The system could be utilized in radiation-hazardous environments, enabling immediate feedback via any suitable communication technologies and logged exposures for real-time or retrospective analysis of ALARA (as low as reasonably achievable) exposures. Additionally, the article could be used by nuclear power workers (or others in relatively high radiation environments) exposed to various ionizing radiation environments and hazards, and the military for use, such as defense and shielding, and monitoring against potential radiological or nuclear threats.

In sheet form, the article can be draped over a surface in order to detect radiation either impinging on or emanating from the surface, depending on the orientation of the sheet. For example, the article can be placed onto radiation-contaminated surfaces with the radiation detector directed inward toward the surface, in order to identify the location of a spilled source on the surface. Alternately, the detectors can be oriented outwardly to detect external radiation and similarly draped over or integrated into equipment. In garment form, the article alerts radiation workers to ongoing radiation exposure, and hence can guide them to compensate their positioning (e.g., stance or proximity) to minimize or eliminate continued exposure. The article can be integrated into protective leaded aprons, skirts, and the like, which already exist in the clinic.

According to one aspect of the present disclosure, an SRSRS system uses the features of at least one scintillator (and corresponding scintillator detector), and reporter to determine and alert to the presence of radiation. The scintillator reacts to the presence of radiation with luminescence; the detector receives the light signal from the scintillator and communicates with the reporter; and the reporter then alerts the user to the presence of radiation. These three elements can be configured in various ways such that the strength and location of the detected radiation is known. Of course, implementations are not limited to scintillators (and corresponding detectors). For example, other suitable real-time-capable radiation detectors, such as solid-state devices, could be used in place of the scintillators/detectors and be configured to enable detection of strength/magnitude and location of detected radiation for appropriate alerting via the reporter(s).

DETAILED DESCRIPTION

The accompanying Figures are provided by way of illustration and not by way of limitation. The foregoing aspects and other features of the disclosure are explained in the following description, taken in connection with the accompanying example figures (also "FIG.") relating to one or more embodiments, in which:

FIGS. 8A-8C illustrate example article substrate configurations with scintillation optical fiber mesh;

FIGS. 10A-10C illustrate example article substrate configurations with individual region composites;

FIGS. 12A-12C illustrate example article substrate configurations with integrated elements;

DETAILED DESCRIPTION

Localized radiation sensing and reporting surfaces are described. An article is provided that provides a localized detection of radiation according to corresponding one or more positions on a substrate of a particular one or more radiation sensors.

One aspect of the present disclosure provides such an article, which can be referred to as an SRSRS. The SRSRS is a lightweight, self-contained, flexible covering that can be used in various settings where ionizing radiation is used. The SRSRS can be integrated into radiation protective garments, such as those used in fluoroscopy suites or sites containing nuclear or generator-produced radiation, or the SRSRS can be formed as a sheet-like material and placed over equipment or on the ground where radiation spills or inadvertent radiopharmaceutical contamination has occurred. In real time, the article detects the locus of intense radiation on various locations, such as on the wearer's body or in a spill on the floor, and reports the location with, for example, LED signals that are easily visible by those in the vicinity of the article. Haptics/stimulation or other signals may be used to directly inform a wearer of exposure. In some implementations, exposure information can further be recorded, relayed wirelessly, and/or displayed other ways or recorded for retrospective analysis, such as when training new medical residents or radiation workers.

For the purposes of promoting an understanding of the principles of the present disclosure, reference will now be made to certain embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

FIGS. 1A-1D illustrate iso-exposure fields overlaid over the more continuous exposure gradient with increasing distance for an occupational radiation worker during fluoroscopy procedures. Fluoroscopy staff must be vigilant about direct and scattered radiation and may not know where they are being exposed, particularly when in the midst of working with a patient at a fluoroscopic system.

Here, four orientations of a fluoroscopic system 100 and associated impact of exposure fields on a worker 105 are shown. Iso-exposure field lines 110 are indicated for each configuration: A is >300 mR/hr; B is 100-500 mR/hr; C is 50-100 mR/hr; D is 25-50 mR/hr; E is 10-25 mR/hr; and F is <10 mR/hr. The fluoroscopic system 100 involves an x-ray generator configured to direct x-rays through a patient on a table to an imaging detector.

Figure 1A:
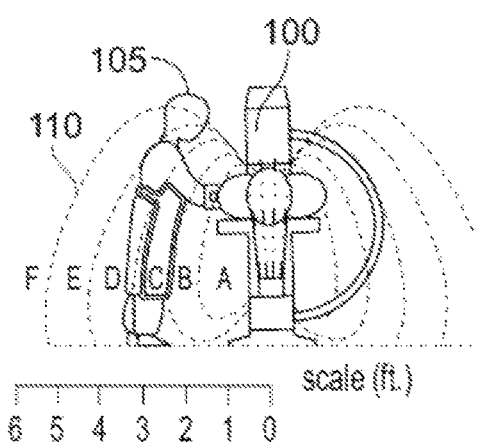
FIGS. 1A-1D illustrate iso-exposure fields overlaid over the more continuous exposure gradient with increasing distance for an occupational radiation worker during fluoroscopy procedures.
Figure 1B:
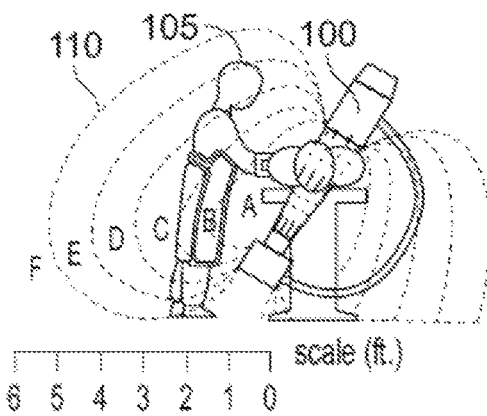
Figure 1C:
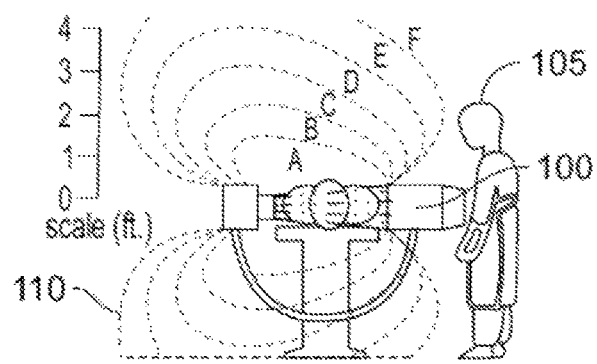
Figure 1D:
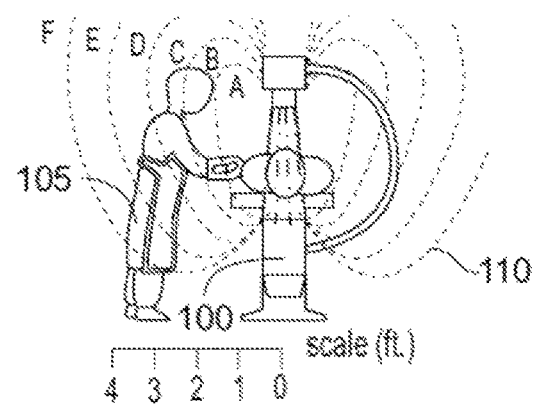

FIG. 1A shows a standard vertical configuration of the fluoroscopic system 100 where the x-ray source is directed upward to the detector. As can be seen, a worker 105 primarily has exposure in the C region, with their head even farther away. FIG. 1B shows the radiation exposure of the worker 105 when the system 100 is at 30° from vertical. Here, the worker 105 primarily has exposure in the B region with some exposure in the A region. FIG. 1C shows the radiation exposure of the worker 105 when the system is in the horizontal position. Here, the worker 105 is outside the illustrated iso-exposure fields. FIG. 1D shows a system in an inverse vertical configuration where the x-ray source is directed downward to the detector in a manner that is not recommended. As can be seen, such a configuration for the system 100 results in the worker 105 with their head in the B region. These images demonstrate that a worker's radiation exposure can vary significantly depending on the orientation of the equipment and the occupational worker's stance about the field. (Figure based on G Sackett. 2020. Radiation Safety Issues for Radiologic Technologists. Presentation by Integrated Science Support, Inc.)

Figure 2:
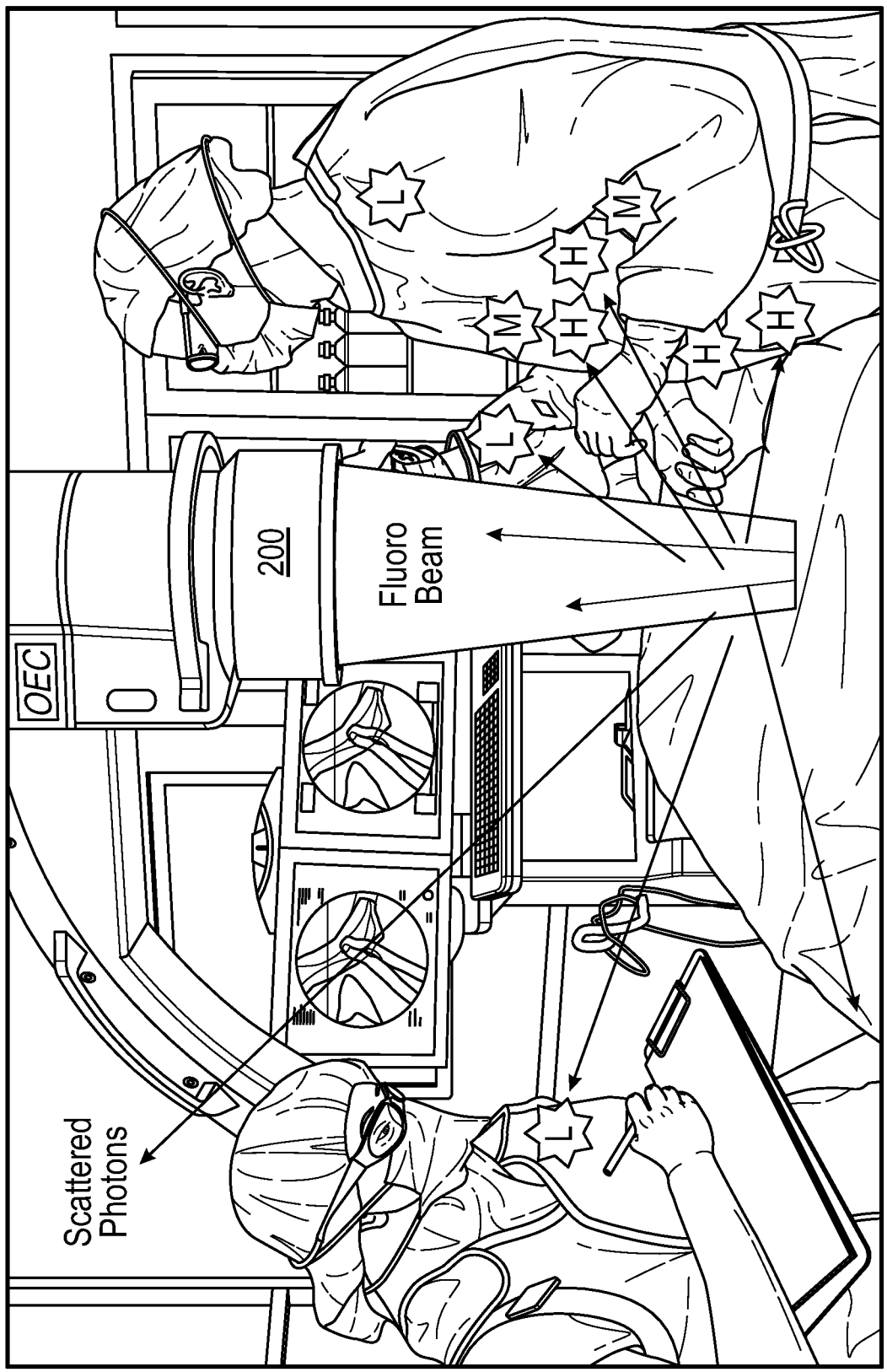
FIG. 2 is an example application of an SRSRS article as disclosed herein, used in a fluoroscopy suite.

FIG. 2 is an example application of an SRSRS article as disclosed herein, used in a fluoroscopy suite. As illustrated in the image of FIG. 2, a fluoroscopy system 200 in the configuration illustrated in FIG. 1A may be causing excess radiation exposure to the workers. By wearing an SRSRS article, localized exposure can be indicated in real-time. In real time, the article detects the locus of intense radiation on various locations, such as on the wearer's body and reports the location with, for example, LED signals that are easily visible by those in the vicinity of the article. The stars superimposed on the protective clothing of the clinicians represent real-time illuminating LEDs, which are embedded into the aprons of the practitioners. Here, low rate detection (L), medium rate detection (M), and high rate detection (H) are indicated (and may also be distinguishable by the amount/intensity of light emitted and/or the color). The colors of the LEDs can be configured to reflect detected radiation levels at the corresponding physical locations, e.g., low levels of radiation are illuminated with green LEDs, medium rates are orange LEDs, and high detection rates are illuminated with red LEDs. The reporter LEDs are disposed on the outside of the lead shielded gowns worn by the workers, such that any illuminated LEDs are easily visible.

Figure 3A:
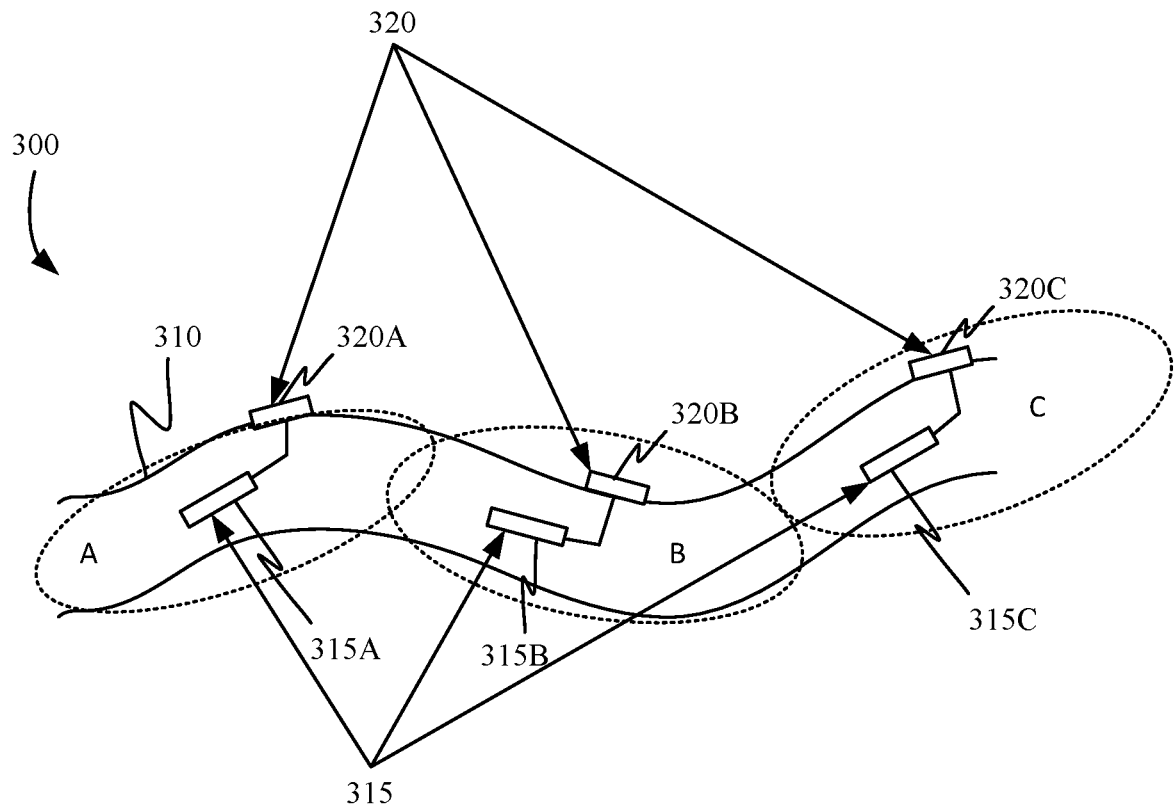
FIGS. 3A and 3B show a perspective view and representative schematic, respectively, of an example article providing a localized radiation sensing and reporting surface.
Figure 3B:
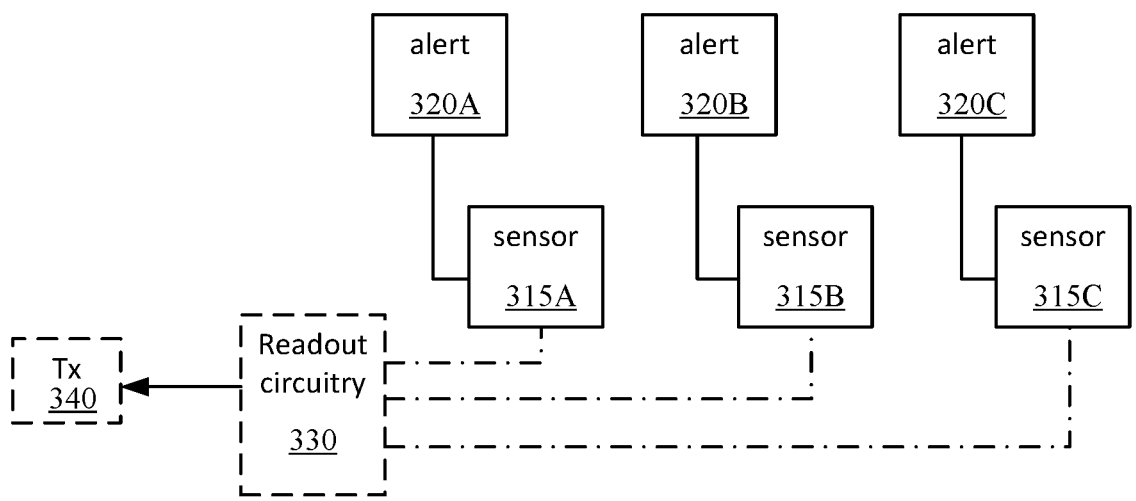

FIGS. 3A and 3B show a perspective view and representative schematic, respectively, of an example article providing a localized radiation sensing and reporting surface. Referring to FIG. 3A, an article 300 is provided that includes a substrate 310, a plurality of radiation sensors 315, and alert circuitry 320 coupled to the plurality of radiation sensors 315. The substrate 310 can be formed of a flexible material, and may be in the form of a garment, cloth (e.g., which can be draped on equipment, people, or even the floor), or floor covering (e.g., intended for covering floor surfaces and possible walking). In the illustrated example, there are three radiation sensors 315A, 315B, 315C and each of these radiation sensors are disposed at a corresponding position (e.g., A, B, and C) on the substrate 310. It should be understood that although the sensors are described as being "on" the substrate, this refers to any position with respect to the substrate, including being within, under, or above the substrate and that it is intended to indicate that the substrate holds the sensors. In some cases, the radiation sensors include scintillators and scintillator detectors (i.e., devices that detect scintillation of the scintillators, such as photodetectors that detect the light signal from a scintillator). In some cases, the radiation sensors include solid state device radiation detectors (e.g., semiconductor-based devices). Scintillator-based radiation sensors are described in detail with respect to FIGS. 4, 6, 7A, 7B, 9A, 9B, 11A, and 11B. Example substrates incorporating such scintillator-based radiation sensors are described in detail with respect to FIGS. 8A-8C, 10A-10C, and 12A-12C.

The alert circuitry indicates, in real time, a localized detection of radiation according to corresponding one or more positions (e.g., A, B, and C) on the substrate 310 of a particular one or more radiation sensors of the plurality of radiation sensors 315. In some cases, the alert circuitry includes one or more LEDs. In some cases, the alert circuitry includes a speaker and sound generator. In some cases, multiple types of alerts are provided (e.g., two or more of local light, local sound, local haptic, remote light, remote sound, and remote haptic). In the illustrated example, each sensor (315A, 315B, 315C) has a corresponding alert circuitry output 320A, 320B, 320C. For example, as shown in the representative schematic of FIG. 3B, each sensor is coupled to a corresponding alert circuitry. In some cases, the corresponding alert circuitry is a light source such as an LED (such that the alert circuitry 320 includes a plurality of LEDs, and each LED of the plurality of LEDs provides the alert circuitry outputs 320A, 320B, 320C). For example, each LED is coupled to a corresponding one radiation sensor of the plurality of radiation sensors and located within a region of the corresponding position of the radiation sensor on the substrate (such as shown in FIG. 3A). The LEDs may be any suitable light emitter (including inorganic and organic LEDs), as well as single and multicolor LEDs from ultraviolet to infrared wavelengths. Indeed, any available compact low power light source may be used.

Also illustrated in FIG. 3B is readout circuitry 330, which may be included when the alert circuitry involves more involved readout processing (e.g., where more than one sensor is coupled to a particular alert circuitry output and it is desired to identify which location detected the radiation) and/or is communicated to an external system (e.g., via optional transmitter 340). Readout circuitry can include detectors, selectors to address specific sensors, comparators, and/or other suitable devices. Through the optional transmitter 340, remote logging of the detected radiation exposure is also possible.

Figure 4:
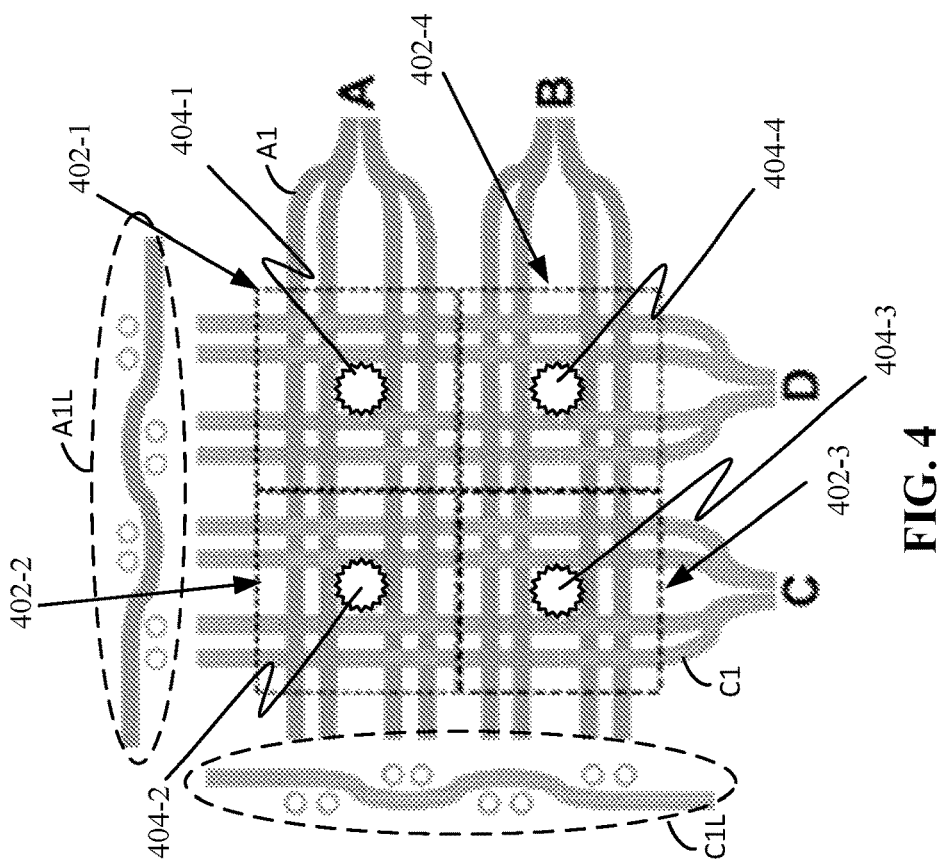
FIG. 4 is a schematic representation of a radiation detection system according to one aspect of the present disclosure.

FIG. 4 is a schematic representation of a radiation detection system according to one aspect of the present disclosure. In this example embodiment, a 4-pixel section is shown, where each of the broken-line squares (labeled 402-1, 402-2, 402-3, 402-4) represent a unit surface area of a garment or sheet formed, for example, with scintillators (see e.g., FIGS. 8B and 10B).

A lateral view of the weave from A1 is shown as A1L and a lateral view of the weave from C1 is shown as C1L. The surface areas 402-1, 402-2, 402-3, 402-4 are defined by a region corresponding to reporter LED(s) 404-1, 404-2, 404-3, 404-4. In a non-limiting example, each unit area is equal to or greater than 5 cm$^2$ and can be formed of one or more crossed-fibers (e.g., unit area of 1×1 strands, 1×2 strands, 2×2 strands, 2×4 strands, 3×3 strands, 5×5 strands, 6×6 strands, etc.), but is in general limited in size in order to provide location-specific information. In the context of the present disclosure, these unit areas and/or the reporter LEDs can be referred to as "pixels". Additionally, the term "LED" can refer to a single LED or an array of LEDs (e.g., RGB) that can be addressed together to produce any color in the available range, and thus include visible, infrared, and/or ultraviolet (UV) emitting LED(s). Different sized pixels can contain different numbers of LEDs in a regional distribution.

The example embodiment of FIG. 4 uses scintillators in the form of scintillating optical fibers (SOFs). SOFs consist of a core scintillating material that produces light from radiation interactions and are largely transparent to that light. The multi-mode optical fibers transmit the generated light through total internal reflections to a remote detector. The fibers are woven together in a generally orthogonal manner to create a mesh. It should be understood that the number of fibers shown in FIG. 4 are for illustration only and should not be construed as limiting the number of fibers in the arrangement. Various types of SOF fibers are suitable for the disclosed article. Additionally, various weave patterns can be used without departing from the scope of the disclosure. Example weave patterns include layered, plain, stranded, and twill, among others (see also FIGS. 14A-14D), ensuring good signal conductance with minimal bending that can otherwise compromise signal level. Layered fibers could be held together by physical connector means like a brace or tie, or by bonding agent, or by coating that mutually covers the layers of fibers. For example, fibers can be coated by dipping or spraying an opaque flexible coating to cover the layers of fibers. The mesh layer and the LED layer can be coupled together or integrated into single substrate. For example, the mesh layer could be used as the substrate to support the LED layer. Furthermore, in some integrated implementations, electronics could be weaved in since they are mostly opaque and not substantially attenuating for the ionizing radiations.

The types of SOF fibers suitable for the disclosed article include fibers with different cross-sections (e.g., square or circular) and a range of diameters (e.g., Kuraray Corp. SCSF-78 in 0.1, 0.25 and 0.5 mm (p). The types of fibers can also include combinations of SOFs and optical fibers, in bundles or fused along the linear length of signal travel, which do not scintillate but still carry signals from the SOFs.

Figure 5:
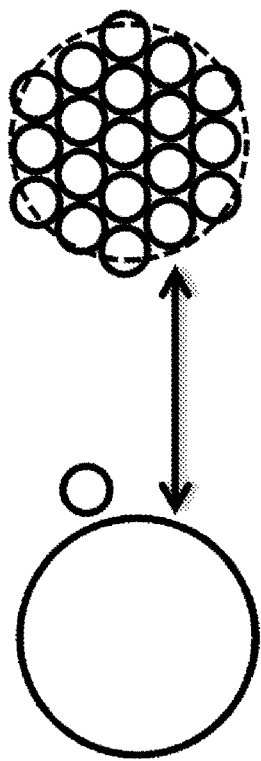
FIG. 5 shows an example of various fiber configurations of equivalent detection volumes.

FIG. 5 shows an example of various fiber configurations of equivalent detection volumes. Referring to FIG. 5, various diameters of fibers can be used. In some cases, the fibers can be provided in a bundle. A bundle of small diameter SOFs can be held together like fibers in garment material.

The individual fibers can be bundled together in a parallel fashion, or the fibers can be twisted together, similar to yarn, and in some embodiments the fibers can be combined with non-scintillating fibers or metal strands or wires for additional strength. Other characteristics of the system can also be customized, such as fill factor (spacing of apertures between fibers), overall packing, and flexibility.

Returning to FIG. 4, fiber groups associated with a row or column of pixels extend to a perimeter of the system, and they are connected to detector channels A, B, C, and D. In this example, each channel is associated with one row or column of pixels (see also FIG. 7A).

Figure 6:
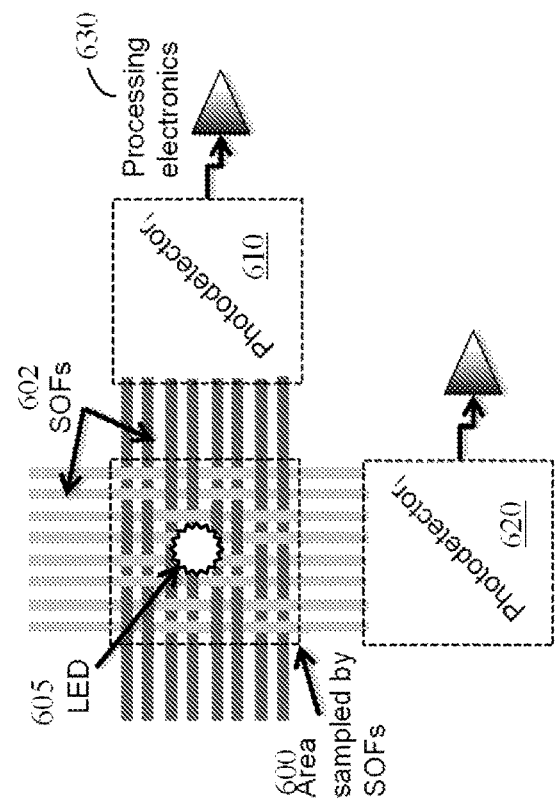
FIG. 6 shows an example of a portion of a detector configuration.

FIG. 6 shows an example of a portion of a detector configuration. Referring to FIG. 6, a unit area 600 of a SOF mesh formed by strands 602 and corresponding LED 605 is shown with one photodetector for each axis (x-axis photodetector 610 and y-axis photodetector 620), which can correspond, for example, to detector channel B and D of FIG. 4. The photodetectors 610, 620 can be coupled to processing electronics 630. When a group of SOFs (e.g., within defined unit area region 600 associated with LED 605) are illuminated by the presence of radiation, the optical signals travel through the fibers and are registered by the detector(s) 610, 620. The detector(s) 610, 620 are in turn connected to the overlaid LED layer (e.g., LED 605). In some cases, the detectors are coupled to circuitry that cause the LED to be connected to a power source to turn on. In some cases, a prescribed program can be used to instruct the LED associated with the illuminated pixel area to turn on.

Figure 7B:
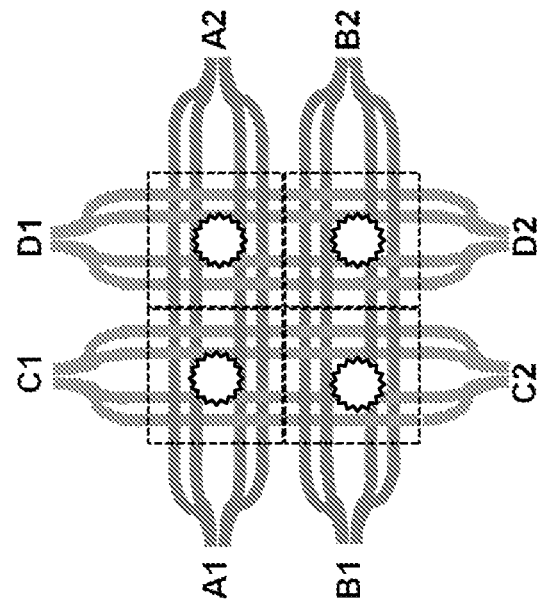
FIGS. 7A and 7B illustrate configurations for a radiation detection system using a scintillation optical fiber mesh coupled to photosensors in one and two directions.
Figure 7A:
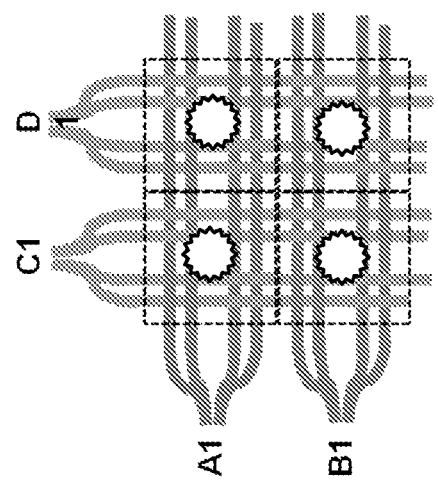

FIGS. 7A and 7B illustrate configurations for a radiation detection system using a scintillation optical fiber mesh coupled to photosensors in one and two directions. Referring to FIG. 7A, similar to the embodiment shown in FIG. 4, one photodetector may be provided for each axis and one LED can be disposed at the center of a region-of-interaction location. Referring to FIG. 7B, a radiation detection system can involve two photodetectors for each axis. Having two photodetectors for each axis can allow additional capabilities, such as measuring relative illumination strength to determine the XY location of the defined unit area exposed to radiation. In the crossed-fiber/weaved configurations where the SOFs are multiplexed, an XY determination is made to identify the pixel that detects radiation in order to reduce the number of photodetectors. For example, there can be 2×N photodetectors for a square grid.

In some embodiments, the detector is in the form of one or more portable silicon photomultipliers (SiPMs) or other suitable, low power, compact photo-sensitive device. In some embodiments, SiPMs are disposed along the edge of the system and are associated with a lengthwise dimension of the system. Thus, the SiPMs establish a "grid" or coordinate plane of the surface, which is translated into discrete XY locations for reporting. One method by which a radiated pixel can be identified is through the simultaneous illumination of crossing strands. For example, in the embodiment shown in FIG. 4, channels AC, AD, BC, and/or BD may be detected. The LEDs are independently addressable after XY determination from the coincidence circuitry, and the color band can be controlled according to prescribed ranges of exposure or rates of detection. These steps can be accomplished through a control system (and suitable circuitry and/or software programming executed by hardware processor/circuitry).

FIGS. 8A-8C illustrate example article substrate configurations with scintillation optical fiber mesh. Referring to FIGS. 8A and 8B, an article can be formed of multiple layers. Here, an article can include first (transparent) fabric layer 802 over a substrate layer 804 with LED 805, which is on a converter/graded absorber layer 806, which is on a SOF mesh layer 808, which is above one or more radiation absorptive shields (e.g., double Pb Shield 1-1 810 and Pb Shield 1-2 812). The article further includes a backing of a second fabric layer 814 at the back side of the double lead shield. This configuration is suitable for a garment (and more or fewer radiation absorptive shields may be included, depending on desired stopping power, material flexibility, and weight). For use as a drop cloth, protecting workers from radiation from the floor (e.g., due to a spill), the article layers can be, from top (e.g., exposed to room) to bottom (e.g., facing floor): a second (sufficiently transparent) fabric layer 814, substrate layer 804 with LED 805, one or more radiation absorptive shields (e.g., double Pb Shield 1-1 810 and Pb Shield 1-2 812), SOF mesh layer 808, converter/graded absorber 816 and first fabric layer 802. The converter/graded absorber 816 may be a same material and thickness or a different material and/or thickness as compared to the converter/graded absorber 806. For example, converter/graded absorber 806 may be thinner than the converter/graded absorber 816 where the LED substrate layer 804 provides some converter/absorber functionality. The one or more radiation absorptive shields can be formed of any suitable material, depending on the type of radiation intending to absorb, for example, plastic, lead, or a combination of plastic and lead may be used. As an illustrative example, x-ray or gamma-ray absorption can be facilitated by Pb Shield layers in the form of the malleable lead layers used in a standard occupational gown.

Figure 9A:
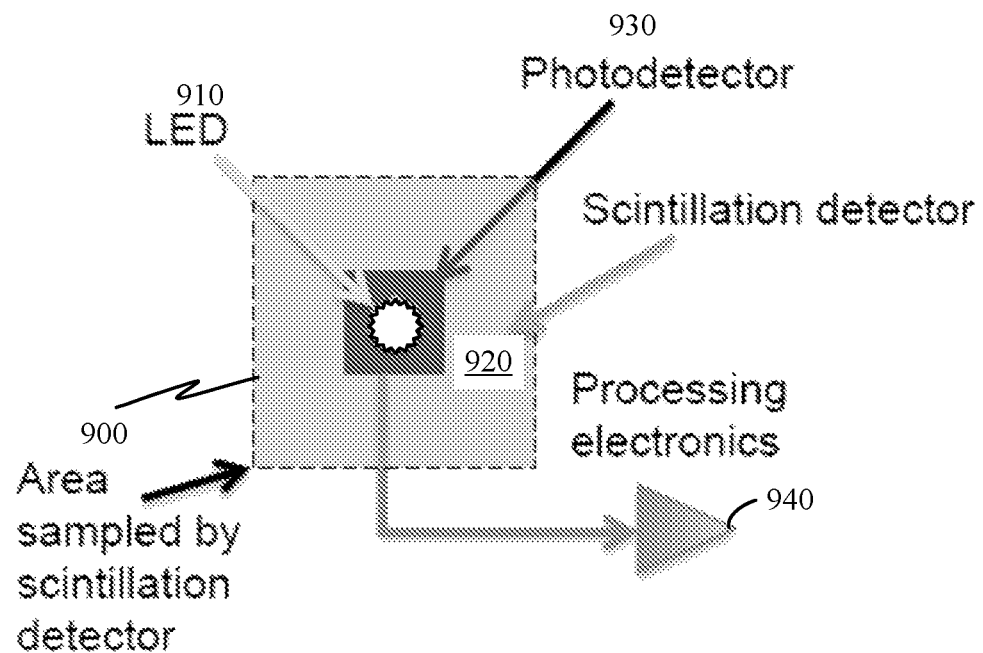
FIGS. 9A and 9B illustrate a detector configuration where a single scintillator and the detector are integrated and disposed directly in the unit area.
Figure 9B:
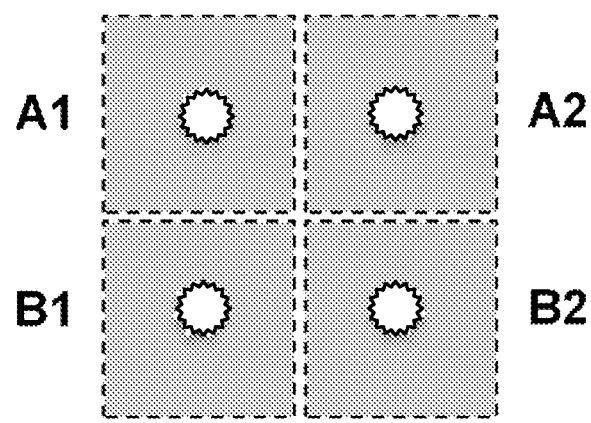

FIGS. 9A and 9B illustrate a detector configuration where a single scintillator and the detector are integrated and disposed directly in the unit area. Referring to FIG. 9A, a unit area 900 formed of an individual region composite ("composite detector") is shown having an LED 910, a scintillation detector 920, photodetector 930, and output to processing electronics 940. Such a configuration of scintillation detector 920 and photodetector 930 may be considered a scintillator-light pipe configuration. Referring to FIG. 9B, similar to described above, the unit area LEDs can be independently addressable from individual pixel determination (e.g., as A1, A2, B1, and B2 in FIG. 9B).

FIGS. 10A-10C illustrate example article substrate configurations with individual region composites. Referring to FIGS. 10A and 10B, an article can be formed of multiple layers, including, from top to bottom: a first (transparent) fabric layer 1002, substrate layer 1004 with LED 1005, converter/graded absorber 1006, composite detector 1008 (e.g., formed of a scintillator, light guide/scintillator, and photodetector), one or more radiation absorptive shields (e.g., double Pb Shield 1-1 1010 and Pb Shield 1-2 1012), and second fabric layer 1014. For use as a drop cloth, protecting workers from radiation from the floor (e.g., due to a spill), the article layers can be, from top (e.g., exposed to room) to bottom (e.g., facing floor): a second (sufficiently transparent) fabric layer 1014, substrate layer 1004 with LED 1005, one or more radiation absorptive shields (e.g., double Pb Shield 1-1 1010 and Pb Shield 1-2 1012), composite detector 1008, converter/graded absorber 1016, and first fabric layer 1002. The converter/graded absorber 1016 may be a same material and thickness or a different material and/or thickness as compared to the converter/graded absorber 1006. For example, converter/graded absorber 1006 may be thinner than the converter/graded absorber 1016 where the LED substrate layer 1004 provides some converter/absorber functionality. The one or more radiation absorptive shields can be formed of any suitable material, depending on the type of radiation intending to absorb, for example, plastic, lead, or a combination of plastic and lead may be used.

One reason for having multiple thinner layers and small segments of detector area is so that the layered composite device is flexible and can mold onto several smoothly varying surfaces that it is in contact with. Other non- or weakly-attenuating layers can be included for protection against (corrosive) fluids or even gases by hermetically sealing/encapsulating the detector, LED, and any electronics layers.

In some cases, the individual region composite configurations can include more photodetectors than that used for the SOF implementations.

Figure 11A:
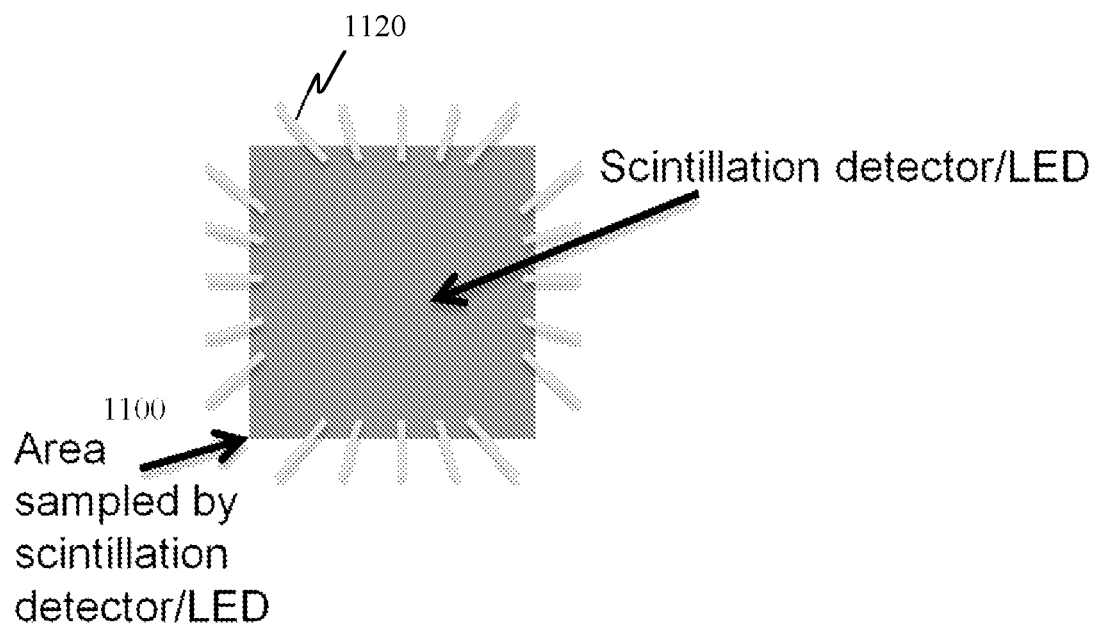
FIGS. 11A and 11B illustrate a detector configuration where the scintillator, detector, and LED are integrated and disposed directly in the unit area.
Figure 11B:
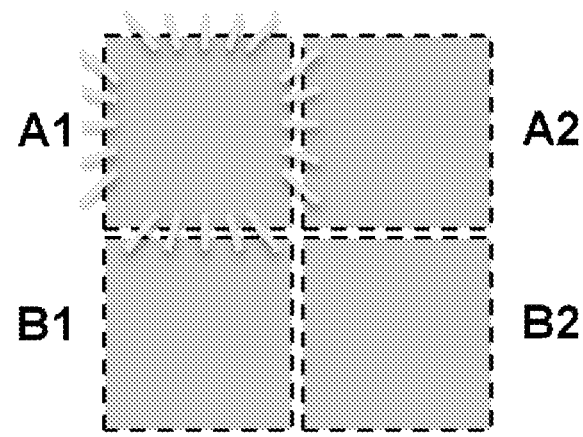

FIGS. 11A and 11B illustrate a detector configuration where the scintillator, detector, and LED are integrated and disposed directly in the unit area. Referring to FIG. 11A, a unit area 1100 formed of an integrated element is shown having a scintillation detector/LED 1110 (with LED light shown emitted as 1120). Here, any available low-profile, light-weight detector (detector/reporter device) may be used. For example, materials such as perovskite crystals can act as both detector and bright LED-like emitter. Referring to FIG. 9B, similar to described above, the unit area LEDs can be independently addressable from individual pixel determination (e.g., as A1, A2, B1, and B2 in FIG. 11B).

FIGS. 12A-12C illustrate example article substrate configurations with integrated elements. Referring to FIGS. 12A and 12B, an article can be formed of multiple layers, including, from top to bottom: a first (transparent) fabric layer 1202, converter/graded absorber allowing light to pass through it 1206, integrated element 1208 (e.g., integrated detector/reporter) providing emitted light 1209 when reporting detection, one or more absorptive shields (e.g., Pb Shield 1-1 1210 and Pb Shield 1-2 1212), and second fabric layer 1214. For use as a drop cloth, the article layers can be, from top (e.g., exposed to room) to bottom (e.g., facing floor): a first fabric layer 1202, a first converter/graded absorber allowing light to pass through it 1206-1, integrated element 1208 (e.g., integrated detector/reporter) providing emitted light 1209 when reporting detection, a second converter/graded absorber 1206-2, and second fabric layer 1214. The one or more radiation absorptive shields can be formed of any suitable material, depending on the type of radiation intending to absorb, for example, plastic, lead, or a combination of plastic and lead may be used. The first converter/graded absorber 1206-1 and the second converter/graded absorber 1206-2 can be the same or different materials and/or thicknesses. In some cases, the second converter/graded absorber 1206-2 can be of a same material and thickness as converter/graded absorber 1016 of FIG. 10C.

As illustrated above, an SRSRS system can include a variety of layers in addition to the sensor/detector and LED layers. These can be, for example, shielding layers, radiation conversion layers, waterproof layers, fabric layers, and/or any other suitable types of layers.

Figure 13:
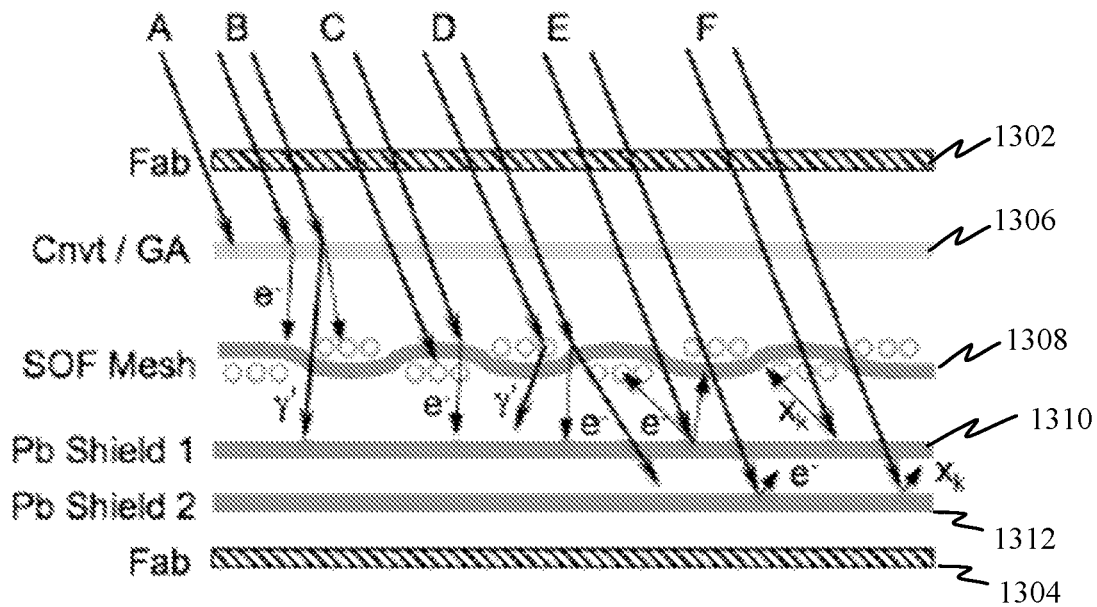
FIG. 13 is an example schematic of a layered SRSRS configuration showing various radiation interactions in different layers of the SRSRS.
Figure 14A:
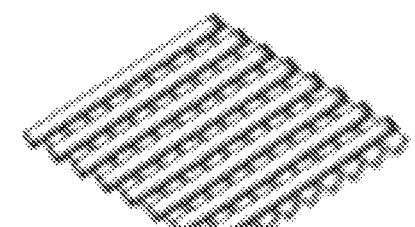
FIGS. 14A-14D illustrate example classical fiber weaves that can be used for a SOF mesh.
Figure 14B:
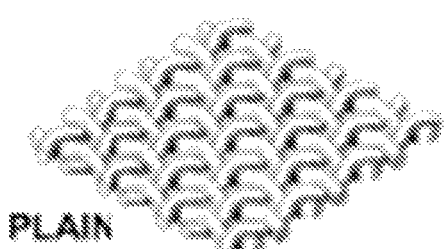
Figure 14C:
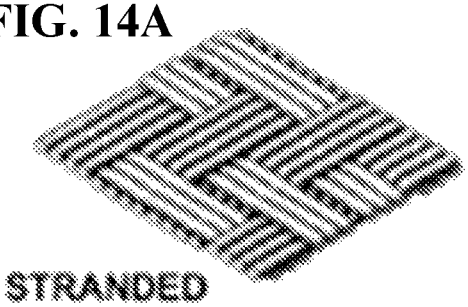
Figure 14D:
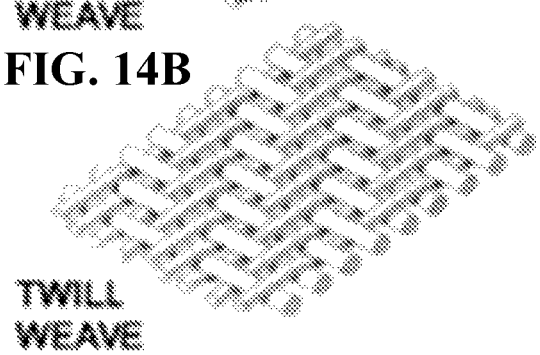

FIG. 13 is an example schematic of a layered SRSRS configuration showing various radiation interactions in different layers of the SRSRS. For simplicity, the LED layer is not shown. In this example embodiment, the additional layers include fabric (Fab) 1302 and 1304, an optional converter (Cnvt) or Graded Absorber (GA) (Cnvt/GA 1306), a SOF XY-mesh 1308, and an absorptive shield layer. In this example, two absorptive shield layers of Pb shield 1 1310 and Pb shield 2 1312 are shown with x-ray or gamma-ray photons impinging on the upper incident surface. The impinging ionizing rays are labelled A-F and depict possible operational functionalities. Ray (A) is a fully absorbed photon in Cnvt/GA 1306 and produces no signal in SOF mesh 1308. Rays (B) are photons which produce secondary electrons (e) or scattered photons (y') upon interacting in the Cnvt/GA 1306 and can "shower" the SOFs 1308. Rays (C) are fully absorbed photons in the SOFs that produce detectable optical signals as well as secondary electrons, as do rays (D) scattered photons, which may expel electrons. Photons that do not interact in the source-side layers can still interact in the protective shields 1310, 1312 and generate € electrons or (F) characteristic x-rays ($x_k$) which may backscatter to the SOFs 1308 and produce signals. Hence, it is to be understood that any combination of the foregoing direct or indirect types of events, as well as other types that will be evident to those of skill in the art, can be detected and reported by the SRSRS system.

In some embodiments, the SRSRS system also includes a haptic layer (not shown). The haptic layer can be located on a layer opposite the LED layer (e.g., on a side close to the wearer's body). The haptic layer can be used either in addition to the LED reporters or as an alternate reporting method to inform the wearer of the exposure.

The SRSRS also includes a control system for processing, transferring, analyzing, recording, and/or reporting radiation. In addition to location-specific reporting, exposure information can also be relayed or reported in any other suitable manner, such as wirelessly to a user interface and/or displayed other ways, stored on computer-readable media for retrospective analysis, etc.

Another aspect of the present disclosure provides a method of detecting radiation exposure with the disclosed devices and systems.

Another aspect of the present disclosure provides all that is described and illustrated herein.

The following Examples are provided by way of illustration and not by way of limitation.

Prototype Development
Mesh Configurations

Flexibility, strength, and sensitivity are important characteristics for the SOF detection layer. FIGS. 14A-14D illustrate example classical fiber weaves that can be used for a SOF mesh. In addition to the various weaves, different SOF cross-sections (square and circular) and diameters (e.g., Kuraray Corp. SCSF-78 in 0.1, 0.25 and 0.5 mm diameter or cross-section) may be used.

For the prototypes, the SOF core is made of polystyrene ($p=1.05$ g/cm$^3$), and x-ray tubes in fluoroscopy are normally operated at 80 kVp, with a mean energy of 50 keV. Thus, if a solid 0.2 mm thick polystyrene plastic plane (representing a bi-layered woven mesh of the 0.1 mm fibers) is considered, the NIST-XCOM absorptions are 0.42% and 0.36% at 50 and 80 keV, respectively. Considering a 1 mm thick polystyrene plastic plane (representing a bilayer of 0.5 mm SOFs), the absorptions are 2.1% and 1.8% at the given energies, respectively. Since a mesh of fibers will have even less sensitivity than a solid plane, it is possible to increase sensitivity by bundling small SOFs by volume in the mesh. Size-dependent durability in the field can determine what SOF size and bundle size and mesh type would be most suitable for a given application. Operating conditions in the battlefield or at a nuclear reactor differ substantially from those in the medical fluoroscopy suite, which can necessitate different combinations optimized under different conditions.

Characterization of Light Output

Figure 15A:
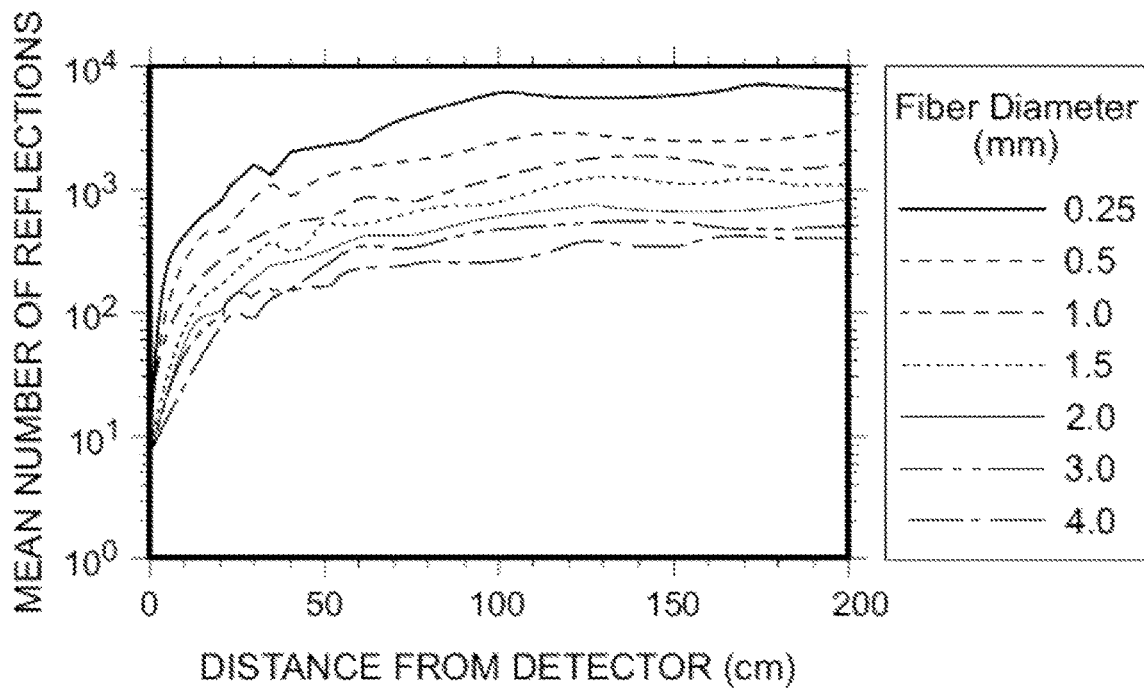
FIGS. 15A and 15B illustrate light intensity characterizations.
Figure 15B:
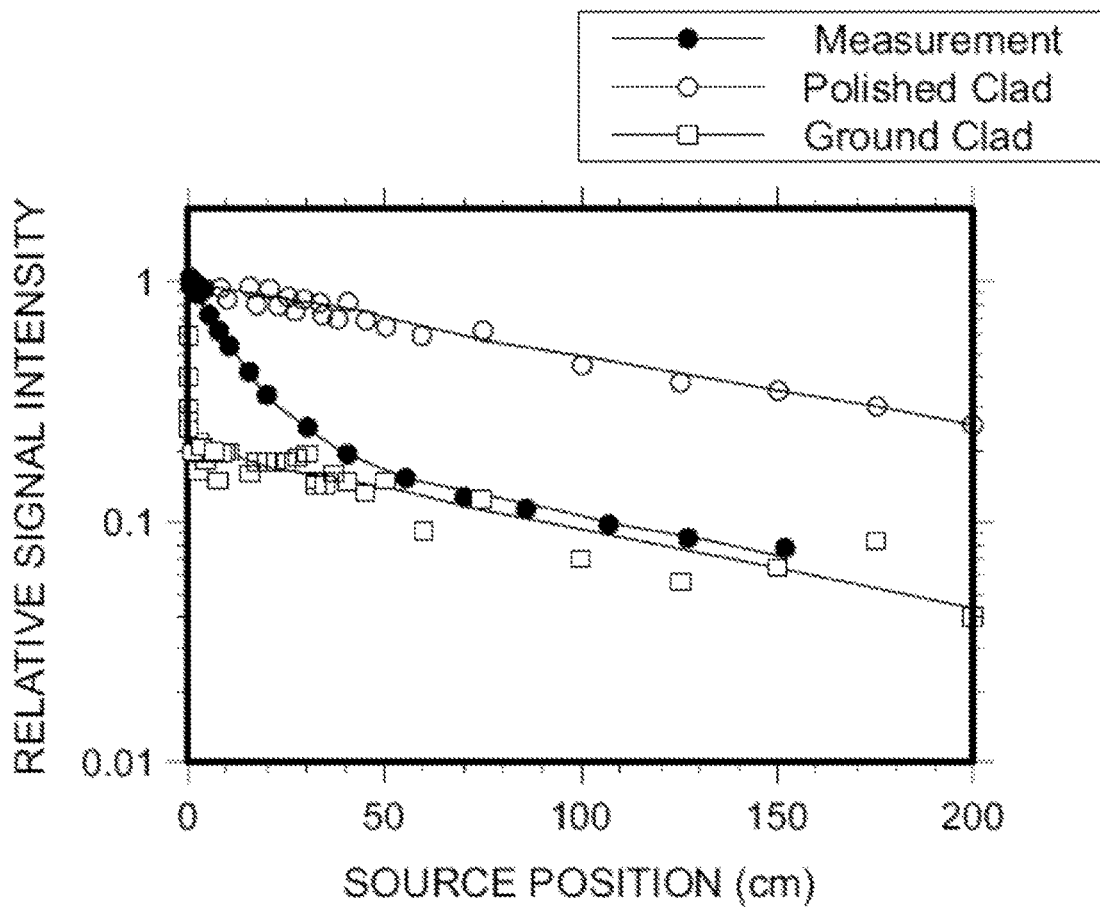

FIGS. 15A and 15B illustrate light intensity characterizations. FIG. 15A depicts DETECT optical simulation results illustrating the mean number of reflections with various fiber diameters for a fixed numerical aperture (NA)=0.75. Note the asymptotic number of reflections with increasing distance from the detector. FIG. 15B shows a comparison of measured and DETECT simulated signal transmission in a 2 mm φ multi-mode optical fiber with different polishes on the cladding. With layered SOFs and flexing of the meshes, one might expect normal wear-and-tear (unless other protective material/sleeve is also present on the outside of the fiber) yielding a "ground clad" surface on the fibers.

In clear optical and SOFs, photons with incident angles greater than or equal to the critical angle (derived from Snell's law as $\theta_{crit}=\sin^{-1}(n_{clad}/n_{core})$) propagate losslessly within the optical fiber due to total internal reflection. This is true when the fiber is straight, though the number of reflections varies with fiber diameter and length, as shown in FIG. 15A. When a fiber is curved, as expected in woven patterns, and when the entire woven sheet is wrapped or contorted around an object or other surface, more light escapes. The losses in fiber transmission due to the length of the optical fiber depend on several factors: numerical aperture, radius of curvature of the bend, and the number of loops or bends. An approximate parameterization for the loss L from a fiber bent in N loops in a fixed radius r is given as: $L=k*\sqrt{N}/r^c$ where k and c are constants derived from fit parameters to measured data. Fortunately, the measured losses from various optical fibers are usually small (<3%) for a single loop with radii down to 2 cm, which is a tight loop. Even for 15 loops with 2 cm radius, the losses total about 5%.

Optimum Coupling Between Scintillators and Detectors

Figure 16A:
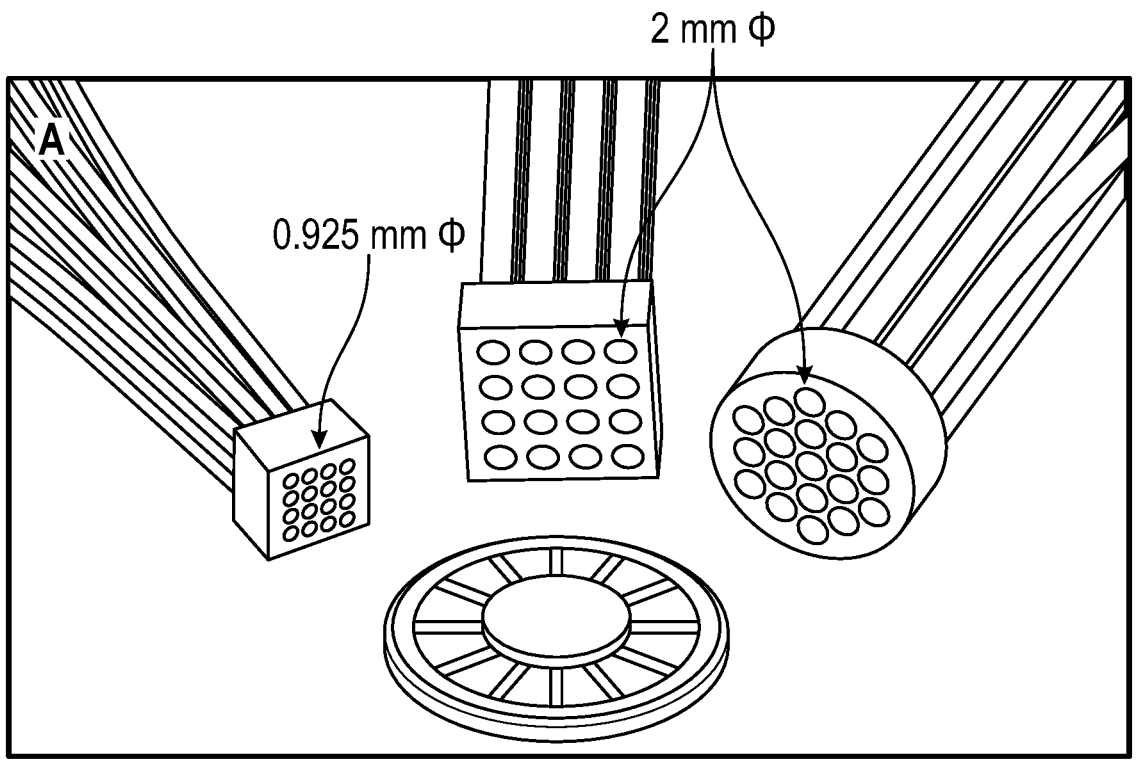
FIG. 16A shows a photograph of variously grouped fiber optic bundles of different fiber sizes.
Figure 16B:
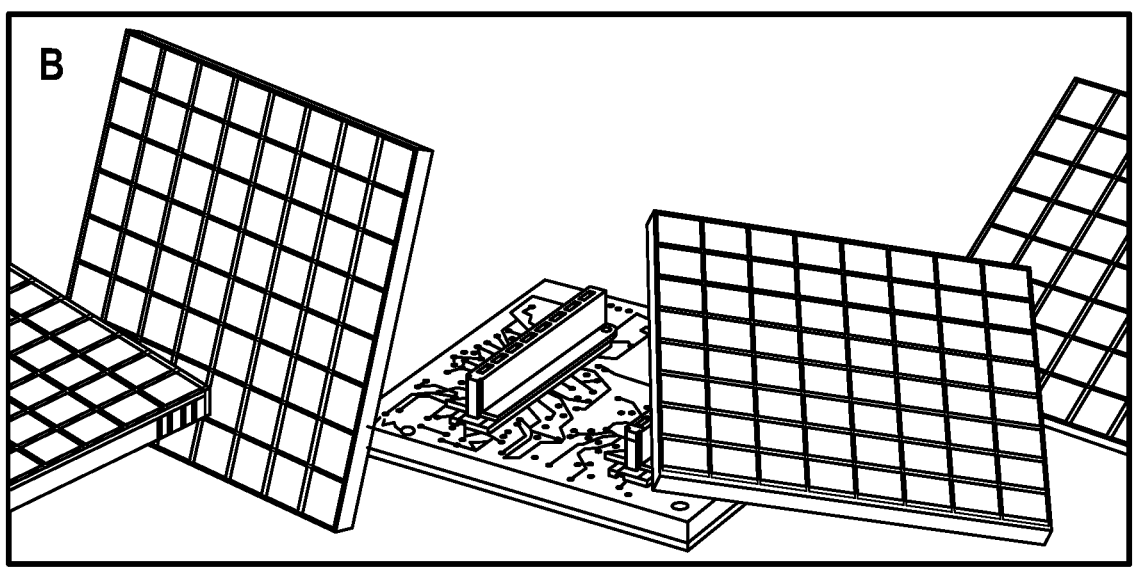
FIG. 16B shows various commercially available SiPM arrays and front-end electronics.

FIG. 16A shows a photograph of variously grouped fiber optic bundles of different fiber sizes (Cartesian grids at left & middle and hexagonal close packed array at right) in a flange which can be coupled to a detector. Fiber sizes shown are different sizes for a different application. US penny is included for scale. FIG. 16B shows various commercially available SiPM arrays and front-end electronics.

Various strategies for securing and coupling the SOFs to the SiPM detectors, similar to those implementations shown in FIGS. 16A and 16B, include grouping strands of SOFs in square grids, or stacking in hexagonal close packing configurations, or pseudo-random bundling of many fibers. For example, while each square bundle in FIG. 16A would be miniaturized to cover the individual larger (e.g., 3×3 mm$^2$) SiPM elements (FIG. 16B) on 3.36 mm pixel pitch, and support the considerably smaller SOFs, arrays of such bundles are used for the 8×8 array of SiPM elements. Coupling could utilize all manner of colored materials, e.g., black, grey, and white plastic supports for the fiber bundles and arrays of bundles based on securing the fibers and desire to minimize any optical crosstalk between SiPM pixels, and determine the maximum pulse heights for known irradiation sources. Linear arrays of SiPMs and individual SiPMs or other compact, lightweight, low power optical light photon detectors can be used.

Coincidence Projection Methodology

Silicon photomultipliers (SiPM) improve over vacuum PMTs including low-light sensitivity and fast coincidence detection, and their form factor allows placing SiPM arrays in compact applications and configurations. Using a modified and versatile PETsys TOF ASIC Evaluation Kit and two 8×8 arrays (e.g., KETEK 8×8 PA3325-WB-0808 SiPM array having 3×3 mm$^2$ pixels (see FIG. 16B), 45% QE$_{peak}$ at 450 nm, low dark count noise, 230 psec coincidence timing resolution), the SiPM arrays are adapted for coincidence detection of the X and Y bundles of SOFs.

Given that x-ray scatter fields have maximally 500 mR/h exposure rates, x-ray fluoro fluence rates of 4.3×10$^4$ ph/mm$^2$-sec are calculated. Also given a calculated detection sensitivity of ~2% for the SOFs, this indicates that the SRSRS device could be exposed to fluxes of 8.6×10$^4$ ph/cm$^2$-sec over the nominally defined 5 cm$^2$ sensitive and LED-pixelated region, well within the PETsys e-Kit's GHz event processing capability. For the nuclear application in detecting small sources, the dynamic range of the SRSRS can be wide ranging, similar to a dose calibrator, since a 1-microCurie source yields ~3.7×10$^4$ ph/micro-Ci, half of which may be directed towards the device. A milli-Ci radiation source has 3.7×10$^7$ ph/milli-Ci, and whose detected count rate is still well within the capabilities of the PETsys e-Kit processing bandwidth capability, and so on.

Instead of the usual coincidences such as arising from a positron-electron annihilation event and measured in PET imaging, "projection coincidences" can be established between the X and Y directional SOFs in a mesh coupled to the SiPM array elements. This means that the X and Y gridded SOFs will detect independent photons occurring in clusters or bunches from the fluoro tube within a small time window; it is the near-simultaneous detection in each X and Y SOF that establishes the location of the interaction for any given "event" to be registered. Using the versatile PETsys e-Kit, it is possible to vary the coincidence timing acceptance windows from 230 psec to 10's of nsec for different collimated flux rates when irradiating different regions of the SRSRS. With different electronics capabilities, yet further ranges of acceptance windows would be possible. It is possible to implement the best lower-level-discriminator (LLD) threshold set for noise and energy discrimination, and it is not intended to window on any specific energy due to the broadband nature of fluoro x-ray spectra, and especially the spectrally non-uniform scatter distributions.

Low-Profile LEDs and Grid Circuitry

Figure 17:
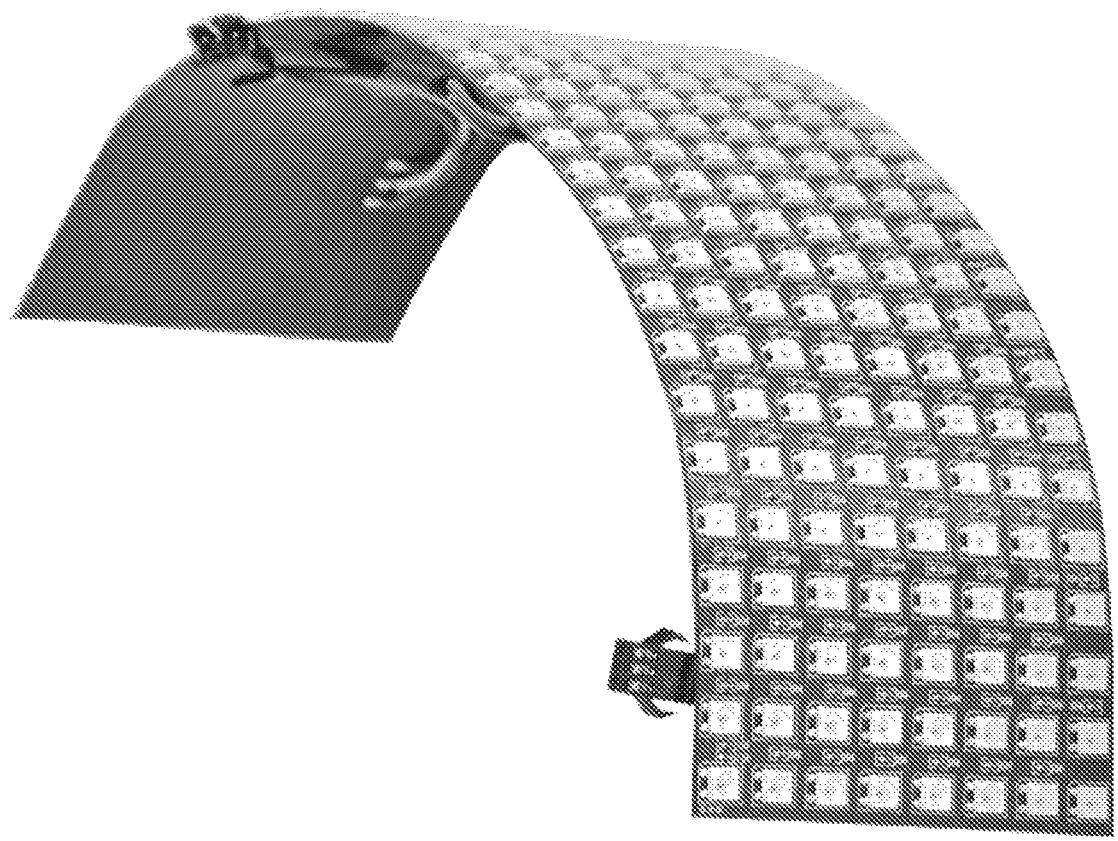
FIG. 17 illustrates a representative flexible LED panel for testing.

As an example, it is possible to configure commercially available, programmable arrays of LEDs (on ~8×32 cm$^2$ sheets) to particular specifications, using one LED per 5 cm (and up to 25 cm$^2$ or larger, depending on the available material). FIG. 17 illustrates a representative flexible LED panel for testing. For the prototype, the LED panel is WS2812 IC Individually Addressable DC5V IP 30 Zofipo Pixels LED light sheet. Each LED on the sheet is addressable through programmable Arduino boards. The LED panel can be tested alone, and then integrated anterior to the SOF detector panel such that the LED "pixel" physically corresponds to the appropriate XY-SOF mesh region. The results of the XY-projection coordinate information will identify the appropriate pixel (XY region) where there was a radiation interaction, and that location information will address the LED panel, such as by using an Arduino Zero (or Arduino IC Digital Addressable Dream Color RGB) programmable board. Depending on the event rate detected by the PETsys unit, the LEDs can be enabled to produce an exposure-dependent color: red for high rate (e.g., 100-500 mR/hr), orange for medium (50-100 mR/hr), and green for low (1-50 mR/hr; other colors and ranges are possible). There may also be a range setting to distinguish rates in fluoroscopy compared with nuclear medicine spilled sources, which have considerably different fluxes depending on the amount of radioactivity, though also more proximal contact which affects overall efficiency of detection.

Alternately, the existing flexible LED panel can be used by only addressing a sparse array of LEDs on the panel at a selected detection area (anywhere from 5 cm$^2$ and up). LED lighting due to radiation interactions in the diodes themselves may be an issue in anticipated high radiation fields and could be used like radiation detectors (e.g., FIGS. 10A-10C). It is possible to determine electronic lower-level discriminator (LLD) and source strength thresholds. One remedy is to truly ensure a sparse LED array, rather than only sparsely utilizing elements on the higher density array that can be purchased commercially or designed specifically for these applications. If the purchased surfaces do not flex as readily as the SOF meshes, the LED arrays will be reconfigured into loosely bound, but secured, strips instead of leaving them in sheets. This way the strips of LEDs will still be addressable in an identical way as on the prefab sheets, but be more highly flexible.

The radiation detection systems described herein optionally include control systems for operational aspects of the systems (e.g., signal analysis, LED illumination instructions, user interface, display of results, etc.). The control systems can be implemented in hardware, software, firmware, or combinations of hardware, software and/or firmware. In some examples, the control systems described in this specification may be implemented using a non-transitory computer readable medium storing computer executable instructions that when executed by one or more processors of a computer cause the computer to perform operations. Computer readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

Articles "a" and "an" are used herein to refer to one or to more than one (i.e., at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless otherwise defined, all technical terms used herein have the same meaning as commonly understood by one of ordinary skill in the art to which this disclosure belongs.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An article comprising:
   a substrate;
   a plurality of radiation sensors, each radiation sensor of the plurality of radiation sensors being disposed at a corresponding position on the substrate; and
   alert circuitry coupled to the plurality of radiation sensors, wherein the alert circuitry indicates, in real time, a localized detection of radiation according to corresponding one or more positions on the substrate of a particular one or more radiation sensors of the plurality of radiation sensors, wherein the alert circuitry comprises a plurality of light sources, and wherein each light source is coupled to a corresponding one radiation sensor of the plurality of radiation sensors and located within a region of the corresponding position of the radiation sensor on the substrate.

2. The article of claim 1, wherein the plurality of radiation sensors comprises optical scintillating fibers.

3. The article of claim 2, wherein the optical scintillating fibers are arranged in a mesh, wherein each radiation sensor corresponds to a defined unit area of the mesh.

4. The article of claim 3, wherein the plurality of radiation sensors further comprises at least one photodetector coupled to the mesh.

5. The article of claim 4, wherein each defined unit area of the mesh comprises two or more optical scintillating fibers in a first direction and two or more optical scintillating fibers in a second direction,
   wherein a first photodetector is coupled to one end of the two or more optical scintillating fibers that are in the first direction and a second photodetector is coupled to one end the two or more optical scintillating fibers that are in the second direction.

6. The article of claim 5, further comprising a third photodetector coupled to another end of the two or more optical scintillating fibers that are in the first direction and a fourth photodetector is coupled to one end the two or more optical scintillating fibers that are in the second direction.

7. The article of claim 4, wherein the plurality of radiation sensors comprises composite detectors, each composite detector comprising a scintillation detector and photodetector in a scintillator-light pipe configuration.

8. The article of claim 1, wherein the alert circuitry comprises a speaker and sound generator.

9. The article of claim 1, wherein the substrate is flexible material.

10. The article of claim 1, wherein the substrate is a garment.

11. The article of claim 1, wherein the substrate is a cloth.

12. The article of claim 1, wherein the substrate is a floor covering.

13. The article of claim 1, wherein the substrate comprises at least two layers selected from the group consisting of:
   a transparent fabric layer;
   light emitting diode substrate layer;
   converter/graded absorber; and
   radiation absorptive shield layer.

\* \* \* \* \*